(12) United States Patent
Mukasa et al.

(10) Patent No.: US 6,606,437 B1
(45) Date of Patent: Aug. 12, 2003

(54) OPTICAL TRANSMISSION LINE, NEGATIVE DISPERSION OPTICAL FIBER USED FOR THE OPTICAL TRANSMISSION LINE, AND OPTICAL TRANSMISSION SYSTEM COMPRISING OPTICAL TRANSMISSION LINE

(75) Inventors: Kazunori Mukasa, Tokyo (JP); Kunio Kokura, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/673,248

(22) PCT Filed: Feb. 22, 2000

(86) PCT No.: PCT/JP00/01004

§ 371 (c)(1),
(2), (4) Date: Oct. 23, 2000

(87) PCT Pub. No.: WO00/50935

PCT Pub. Date: Aug. 31, 2000

(30) Foreign Application Priority Data

Feb. 22, 1999 (JP) ............................................. 11-043022

(51) Int. Cl.[7] ................................................. G02B 6/02
(52) U.S. Cl. ......................... 385/123; 385/126; 385/127
(58) Field of Search ................................. 385/123, 124, 385/100, 126, 127

(56) References Cited

U.S. PATENT DOCUMENTS

| | | | | |
|---|---|---|---|---|
| 5,905,838 A | * | 5/1999 | Judy et al. | 359/109 |
| 5,995,694 A | * | 11/1999 | Akasaka et al. | 385/123 |

FOREIGN PATENT DOCUMENTS

| | | | | |
|---|---|---|---|---|
| EP | 859481 A1 | | 8/1998 | H04B/10/18 |
| JP | 6-342952 A | | 12/1994 | H01S/3/10 |
| JP | 09-023187 | * | 1/1997 | |
| JP | 10-325913 A | | 12/1998 | G02B/6/16 |
| JP | 11-17656 A | | 1/1999 | H04L/14/00 |
| JP | 11-84158 A | | 3/1999 | H01S/3/10 |

OTHER PUBLICATIONS

Musaka et al., Novel Network Fiber to Manage Dispersion AT 1.55 Zero Dispersion Single Mode Fiber, 23rd European Confereon Optical Communications, Bol. 1, Sep. 1997, Conference Publication No. 448, pp. 127–130.

(List continued on next page.)

*Primary Examiner*—Ellen E. Kim
(74) *Attorney, Agent, or Firm*—Oblon, Spivak, McClelland, Maier & Neustadt, P.C.

(57) ABSTRACT

This invention provides an optical transmission line, which is small in dispersion in the 1570 to 1620 nm band (L-band) and low in nonlinearity, and thereby enables wavelength division multiplexed transmission in the 1520 to 1620 nm band, which contains the wavelength band that has been considered priorly. With this optical transmission line, an optical amplification device (32), an SMF (33), and an L-RDF (34) are connected in that order to comprise a block, and one or more such blocks are inserted between an optical signal sending device (31) and an optical signal receiving device (35) to form the optical transmission line. With SMF (33), the dispersion value and dispersion slope value in a preset wavelength band within the L-band are both positive. L-RDF (34) is a line-type negative dispersion optical fiber that compensates the dispersion and dispersion slope of SMF (33) in the abovementioned preset wavelength band. By connecting these SMF's (33) and L-RDF's (34), the dispersion value in the abovementioned preset wavelength band of the optical transmission line as a whole is made greater than or equal to −1 ps/nm/km and less than or equal to 1 ps/nm/km.

14 Claims, 10 Drawing Sheets

OTHER PUBLICATIONS

Aisawa et al., Ultra–wideband, Long Distance WDM Demonstration of 1 Tbit/s (50 x 20 Gbit/s), 600 km TRANSMISSION USING 1550 AND 1580 NM WAVELENGTH BANDS; ELECTRONICS LETTERS, vol. 34, No. 11, 28$^{th}$ May 1998, pp. 1127–1128.

Sakamoto et al., Wide Wavelength Band (1535–1560 NM and 1574–1600 NM), 28 x 10Gbit/s WDM TRANSMISSION OVER 320 KM DISPERSION–SHIFTED FIBER; ELECTRONICS LETTERS, vol. 34, No. 4, Feb. 19, 1998, pp. 392–394.

Peucheret et al., Band Transmission over 1000 KM Using Standard and Dispersion–Compensating Fibers in Pre–Compensation Scheme Optimised at 1550 NM; Electronics Letters, Sep. 30, 1999. Vol. 35,m No. 20, pp. 1759–1761.

Kani et al., Bidirectional Transmission to Supress Inter-wavelength–Band Nonlinear Interactions in Ultrawide–Band WDM Transmission Systems; IEEE Photonics Technology Letters, vol. 11, No. 3, Mar. 1999, pp. 376–378.

* cited by examiner

Fig. 3
(a)
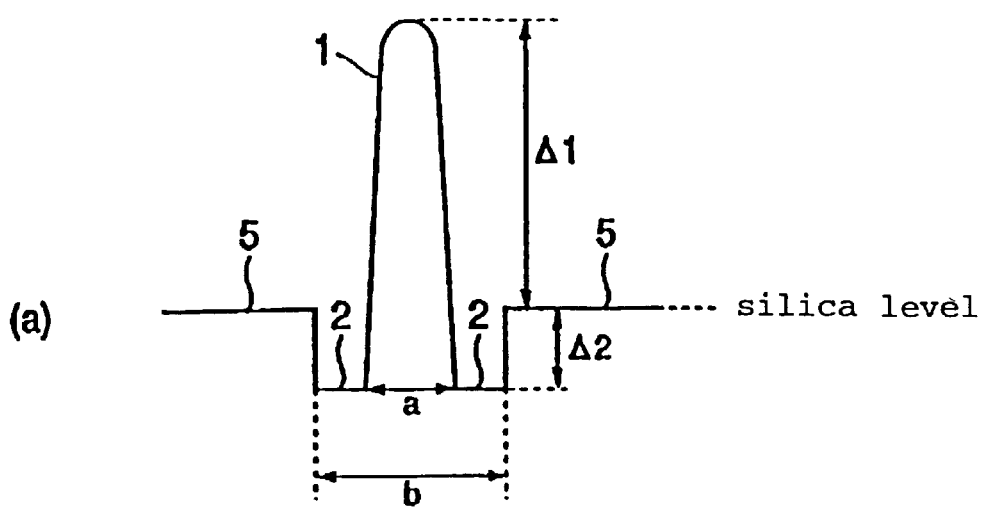
(b)
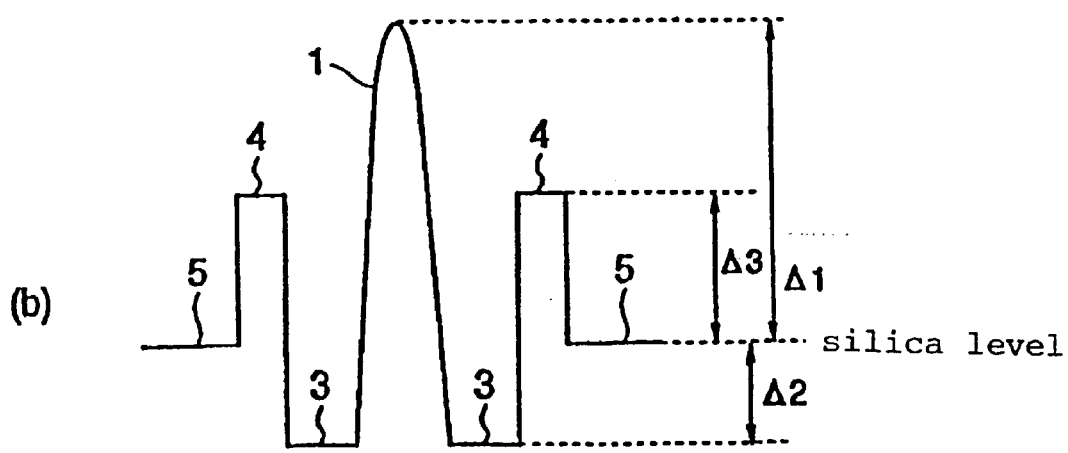

Fig. 10
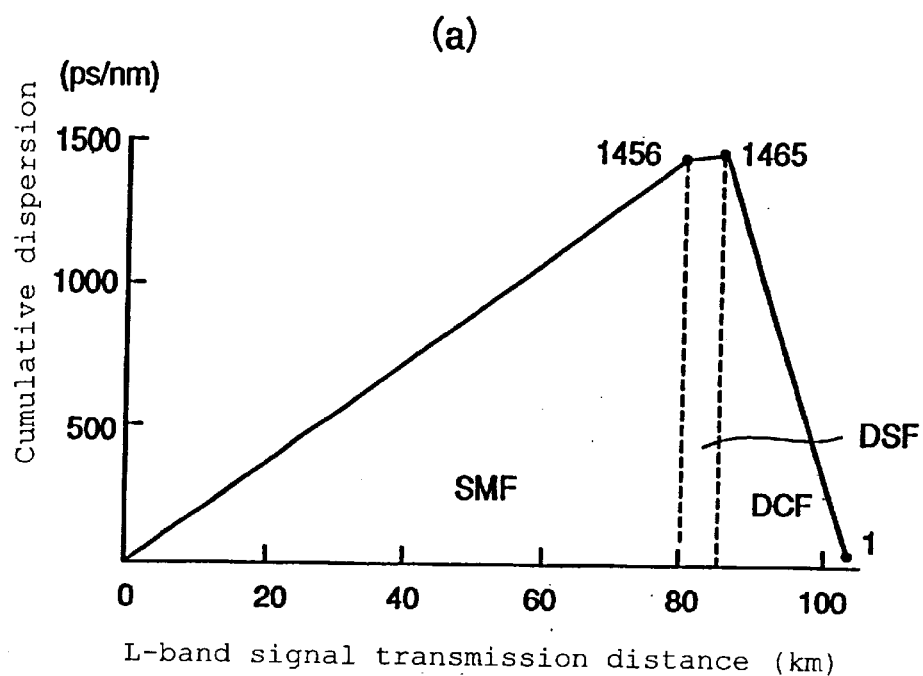
(a)
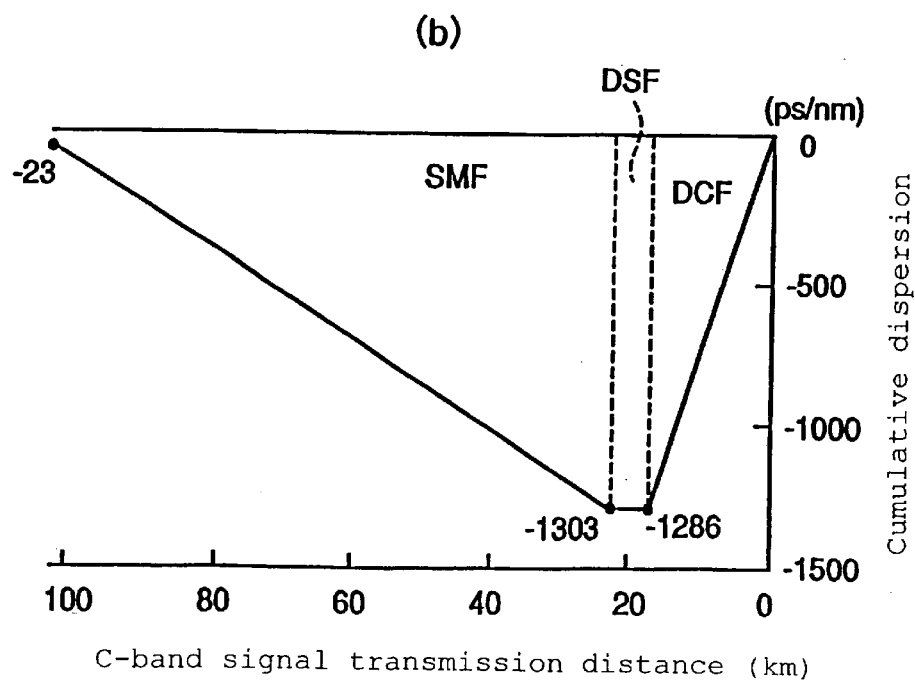
(b)

Fig. 1 2
(a)
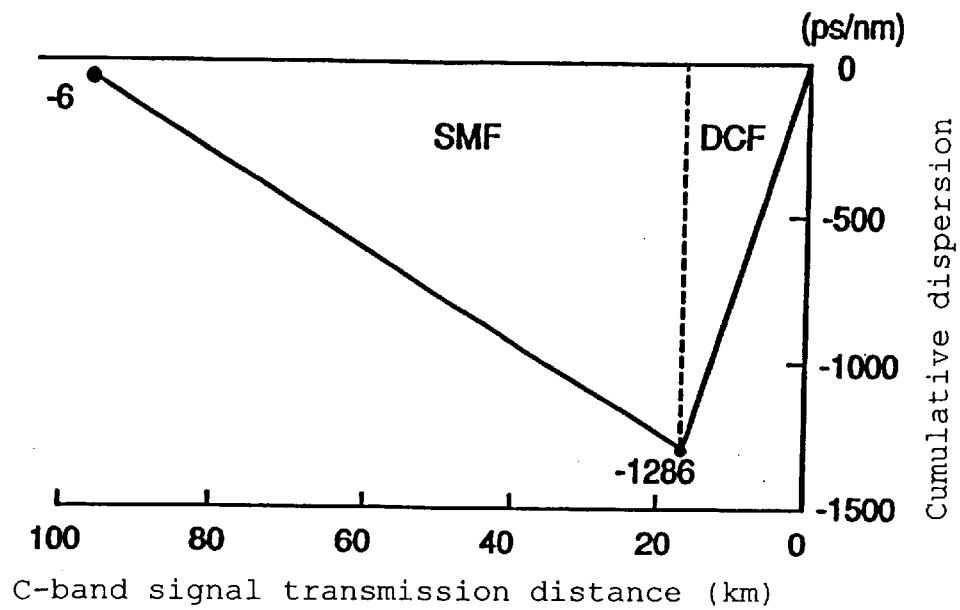
C-band signal transmission distance (km)
(b)
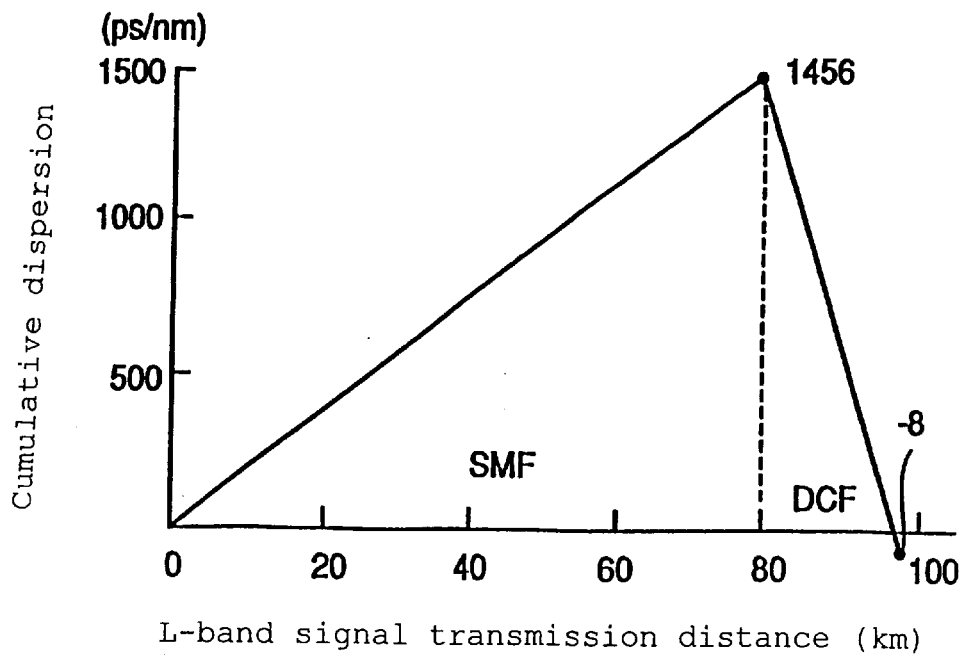
L-band signal transmission distance (km)

OPTICAL TRANSMISSION LINE, NEGATIVE DISPERSION OPTICAL FIBER USED FOR THE OPTICAL TRANSMISSION LINE, AND OPTICAL TRANSMISSION SYSTEM COMPRISING OPTICAL TRANSMISSION LINE

BACKGROUND OF THE INVENTION

1. Field of the Invention

The present invention concerns an optical transmission line, which is used for example for wavelength division multiplexed optical transmission, a negative dispersion optical fiber to be used in the optical transmission line, and an optical transmission system which uses the optical transmission line.

2. Discussion of the Background

Generally, a single mode optical fiber (shall be referred to hereinafter as "SMF") is used in an optical transmission line, and this SMF has a zero dispersion wavelength in the 1310 nm band. Though the use of this SMF for optical transmission in the 1550 nm band is being considered, the SMF has a positive dispersion value and a positive dispersion slope in the 1550 nm band. Thus when the SMF is used singly for wavelength division multiplexed optical transmission in the 1550 nm band, the ill effect of wavelength dispersion occurs. Therefore, in order to compensate for this wavelength dispersion, active research is being carried out on module-type wavelength dispersion compensation optical fibers for short length use (this type of module-type dispersion compensated optical fiber shall be referred to hereinafter as "DCF"). Such a DCF is disclosed for example in Japanese Laid-open Patent Publication No. Hei 6-11620.

As an example of a DCF, a DCF has been developed with which the refractive index of the center core is made high to make the dispersion value a large negative value and thereby achieve a high figure of merit (FOM) (FOM=approximately 200).

Also, known forms of refractive index profiles of DCF's include single peak type profiles, such as those of matched cladding type fibers, and multiple cladding type fibers, such as W-type fibers. The abovementioned single peak type DCF has a positive dispersion slope. Thus when this type of DCF is connected to an SMF, though the dispersion at a single wavelength will be compensated, the dispersion slope will increase further. This type of DCF is therefore unsuitable for wavelength division multiplexed transmission (shall be referred to hereinafter as "WDM transmission"). Meanwhile, W-type and other types of multiple cladding type DCF's are optical fibers that can compensate the dispersion and dispersion slope of an SMF. These fibers have thus been attracting attention in that they provide an arrangement suitable for WDM transmission when connected with an SMF.

That is, a slope compensation type dispersion compensation fiber (DFCF), which can compensate the dispersion value and the dispersion slope at the same time, is being demanded for compensation of the wavelength dispersion of an SMF. A high FOM and the control of the compensation factor described below are required of such a DCF.

The dispersion compensation performance that is exhibited when a DCF is connected with an ordinary SMF can be understood readily when expressed by the compensation factor as follows:

$$\text{Compensation factor } (\%) = \{(S_{DCF}/S_{SMF})/(D_{DCF}/D_{SMF})\} \quad (1)$$

In equation (1), SDCF is the dispersion slope of the DCF, SSMF is the dispersion slope of the SMF, DDCF is the dispersion value of the DCF, and DSMF is the dispersion value of the SMF. The above values are values within the bandwidth of SMF dispersion compensation by the DCF (conventionally, a bandwidth of 1520 to 1570 nm) or values at an arbitrary wavelength within this wavelength band. With regard to the above equation, wide bandwidth zero dispersion can be accomplished more successfully the closer the compensation factor is to 100%. An optimal design for this DCF is proposed in Japanese Laid-open Patent Publication No. Hei 8-136758.

However, such a DCF aimed at short lengths is effective only for dispersion compensation of SMF's that have been installed presently and cannot comprise a new fiber line just by itself. Due to the nature of its profile, the above-described DCF cannot maintain the low nonlinearity that is the excellent feature of SMF's. That is, a DCF is aimed at compensating the dispersion value or dispersion slope of an SMF with as short a length as possible. A DCF is thus generally small in MFD and large in Δ1, and such a DCF tends to be extremely likely to give rise to nonlinear phenomena.

Recently, line-type dispersion compensation optical fibers with dispersion characteristics that are inverse to those of the SMF (this type of line-type dispersion compensation optical fiber shall be referred to hereinafter as "RDF") are being considered as optical fibers of low nonlinearity that can compensate the dispersion and dispersion slope efficiently. RDF's are described for example in ECOC '97 Vol.1 p.127 and Japanese Laid-open Patent Publication No. Hei 10-319920.

The above-described conventional DCF's and RDF's are designed only for compensation in the 1520 nm to 1570 nm band (shall be referred to hereinafter as the "C-band").

Recently, the use of a wavelength band of 1570 nm or more, or to be more specific, the use of the 1570m to 1620 nm band (shall be referred to hereinafter as the "L-band") for wavelength division multiplexed optical transmission is being considered. For example, optical amplifiers that can amplify light of the L-band are being developed. Expansion of the wavelength band of wavelength division multiplexed optical transmission by performing wavelength division multiplexed optical transmission using both this L-band and the abovementioned C-band is being considered.

However at present, dispersion compensation optical fibers for compensation in the L-band have not been proposed and optical transmission lines for performing wavelength multiplexed optical transmission in the wavelength band of the L-band have not been realized.

Though optical transmission lines that are comprised of SMF's and dispersion compensation optical fibers have merits, such as ① to ③ given below, since such transmission lines were targeted mainly at the C-band, they are not suitable as L-band wavelength division multiplexed optical transmission lines. The abovementioned merits include the following: ① SMF of low nonlinearity and low loss can be used. ② The dispersion in the C-band becomes flat. ③ Since the line has a large local dispersion (dispersion value per unit length), the occurrence of four-wave mixing (shall be referred to hereinafter as "FWM"), which becomes prominent near zero dispersion, can be restricted.

FIG. 13 is a conceptual diagram of the dispersion characteristics of the condition where an SMF is connected to an RDF for C-band compensation. As shown in FIG. 13, an optical transmission line, in which an SMF is connected to a C-band compensation RDF, has a large negative dispersion and dispersion slope in the L-band. Thus when an L-band optical signal is transmitted through an optical transmission line for the C-band, the distortion of the signal waveform due to dispersion becomes a large obstacle that makes WDM transmission in the L-band difficult. The same can be said for a DCF for C-band compensation.

An optical transmission line and an optical transmission system, with which wavelength division multiplexed optical transmission can be performed using both wavelength bands of the L-band and the C-band as mentioned above, were thus difficult to realize.

SUMMARY OF THE INVENTION

The present invention has been made to solve the above problems. That is, a final object of this invention is to present a wavelength division multiplexed optical transmission system with which wavelength division multiplexed optical transmission can be performed using both wavelength bands of the L-band and the C-band. In order to achieve this purpose, this invention first provides an optical transmission line that enables high-quality wavelength division multiplexed optical transmission in the L-band and an optical transmission line that enables high-quality wavelength division multiplexed optical transmission in the C-band. In order to realize these optical transmission lines, this invention provides a negative dispersion optical fiber that enables dispersion compensation of an SMF or other positive dispersion optical fiber in a preset wavelength band.

An optical transmission line of the first arrangement of this invention is characterized in that a positive dispersion optical fiber, with which both the dispersion value and dispersion slope in a preset wavelength band within a wavelength band of 1570 to 1620 nm are positive, is connected to a negative dispersion optical fiber, which compensates the dispersion and dispersion slope of the abovementioned positive dispersion optical fiber in the abovementioned preset wavelength band to make the dispersion value of the optical transmission line as a whole greater than or equal to −1 ps/nm/km and less than or equal to 1 ps/nm/km within the abovementioned preset wavelength band.

An optical transmission line of the second arrangement of this invention is characterized in that a positive dispersion optical fiber, with which both the dispersion value and dispersion slope in a preset wavelength band within a wavelength band of 1570 to 1620 nm are positive, a negative dispersion optical fiber, which compensates the dispersion and dispersion slope of the abovementioned positive dispersion optical fiber in a wavelength band adjacent to the wavelength band of 1570 to 1620 nm, and a dispersion characteristics adjustment fiber, which compensates the dispersion and dispersion slope in the abovementioned preset wavelength band of the optical fiber :connection unit formed by connection of the abovementioned negative dispersion fiber and the abovementioned positive dispersion optical fiber, are connected to make the dispersion value of the optical transmission line as a whole greater than or equal to −1 ps/nm/km and less than or equal to 1 ps/nm/km within the abovementioned preset wavelength band.

An optical transmission line of the third arrangement of this invention is characterized in that, in addition to having the above-described second arrangement, the wavelength band adjacent the wavelength band of 1570 to 1620 nm is set to the wavelength band of 1520 to 1570 nm.

An optical transmission line of the fourth arrangement of this invention is characterized in that, in addition to having the above-described first, second, or third arrangement, the dispersion value of the optical transmission line as a whole is made greater than or equal to −1 ps/nm/km and less than or equal to 1 ps/nm/km within the 1520 to 1570 nm wavelength band.

An optical transmission line of the fifth arrangement of this invention is characterized in that, in addition to having the above-described first, second, or third arrangement, a function for compensating the wavelength dependence of the transmission loss in the wavelength band of 1570 to 1620 nm is provided.

An optical transmission line of the sixth arrangement of this invention is characterized in that, in addition to having the above-described fourth arrangement, a function for compensating the wavelength dependence of the transmission loss in the wavelength band of 1570 to 1620 nm is provided.

An optical transmission line of the seventh arrangement of this invention is characterized in that a positive dispersion optical fiber, with which both the dispersion value and dispersion slope in a preset wavelength band within a wavelength band of 1520 to 1570 nm are positive, a negative dispersion optical fiber, which compensates the dispersion and dispersion slope of the abovementioned positive dispersion optical fiber in a wavelength band adjacent the wavelength band of 1520 to 1570 nm, and a dispersion characteristics adjustment fiber, which compensates the dispersion and dispersion slope in the abovementioned preset wavelength band of the optical fiber connection unit formed by connection of the abovementioned negative dispersion fiber and the abovementioned positive dispersion optical fiber, are connected to make the dispersion value of the optical transmission line as a whole greater than or equal to −1 ps/nm/km and less than or equal to 1 ps/nm/km within the abovementioned preset wavelength band.

An optical transmission line of the eight arrangement of this invention is characterized in that the wavelength band adjacent the wavelength band of 1520 to 1570 nm is set to the wavelength band of 1570 to 1620 nm.

An optical transmission line of the ninth arrangement of this invention is characterized in that, in addition to having the arrangement of the above-described first, second, third, sixth, seventh, or eighth arrangement, the abovementioned positive dispersion optical fiber has a positive dispersion in at least the wavelength band of 1520 to 1620 nm.

An optical transmission line of the tenth arrangement of this invention is characterized in that, in addition to having the arrangement of the above-described fourth arrangement, the abovementioned positive dispersion optical fiber has a positive dispersion in at least the wavelength band of 1520 to 1620 nm.

An optical transmission line of the eleventh arrangement of this invention is characterized in that, in addition to having the arrangement of the above-described fifth arrangement, the abovementioned positive dispersion optical fiber has a positive dispersion in at least the wavelength band of 1520 to 1620 nm.

An optical transmission line of the twelfth arrangement of this invention is characterized in that, in addition to having the arrangement of the above-described first, second, third, sixth, seventh, or eighth arrangement, the abovementioned negative dispersion optical fiber has a negative dispersion in at least the wavelength band of 1520 to 1620 nm.

An optical transmission line of the thirteenth arrangement of this invention is characterized in that, in addition to having the arrangement of the above-described fourth arrangement, the abovementioned negative dispersion optical fiber has a negative dispersion in at least the wavelength band of 1520 to 1620 nm.

An optical transmission line of the fourteenth arrangement of this invention is characterized in that, in addition to having the arrangement of the above-described fifth arrangement, the abovementioned negative dispersion optical fiber has a negative dispersion in at least the wavelength band of 1520 to 1620 nm.

A negative dispersion optical fiber of the first arrangement of this invention is characterized in being used in any of the above-described optical transmission lines of the first through fourteenth arrangements, having the dispersion value at an arbitrary single wavelength in the preset wavelength band within the wavelength band of 1570 to 1620 nm being set greater than or equal to −75 ps/nm/km and less than or equal to −15 ps/nm/km, and being made negative in the value of the dispersion slope in the abovementioned preset wavelength band and thereby provided with the characteristics of lowering the dispersion value and dispersion slope in the abovementioned preset wavelength band of a positive dispersion optical fiber installed in the abovementioned optical transmission line.

A negative dispersion optical fiber of the second arrangement of this invention is characterized in that, in addition to having the arrangement of the above-described negative dispersion optical fiber of the first arrangement, the transmission loss at an arbitrary single wavelength in the preset wavelength band within the wavelength band of 1570 to 1620 nm is set to 0.27 db/km or less, the polarization dependence loss is set to 0.15 ps/km1/2 or less, and the mode field diameter is set to 5.5 µm or more to provide bending loss characteristics that enable the fiber to be made into a cable.

A negative dispersion optical fiber of the third arrangement of this invention is characterized in that, in addition to having the arrangement of the above-described negative dispersion optical fiber of the first or second arrangement, a center core with an outer diameter of a, a side core, which surrounds the center core and has an outer diameter of b, and a cladding, which surrounds the side core, are provided, and when the specific differential refractive indices of the abovementioned center core and side core based on the refractive index of the abovementioned cladding are given as Δ1 and Δ2, respectively, the value of a/b is set within the range, 0.4 to 0.55, the value of Δ2/Δ1 is set within the range, −0.45 to −0.30, Δ1 is set within the range, 1 to 1.4%, and the value of a is set within the range 10.5 to 14.0 µm.

A negative dispersion optical fiber of the fourth arrangement of this invention is characterized in that, in addition to having the arrangement of the above-described negative dispersion optical fiber of the first or second arrangement, a center core with an outer diameter of a, a first side core, which surrounds the center core and has an outer diameter of b, a second side core, which surrounds the first side core and has an outer diameter of c, and a cladding, which surrounds the second side core, are provided, and when the specific differential refractive indices of the abovementioned center core, first side core, and second side core based on the refractive index of the abovementioned cladding are given as Δ1, Δ2 and Δ3, respectively, the value of Δ1 is set within the range, 0.9 to 1.5%, the value of Δ2 is set within the range, −0.5 to −0.2%, the value of Δ3 is set within the range, 0.2 to 0.3%, a, b, and c are set to satisfy a<b<c, the value of a:b:c is set within the range, 1:2 to 2.5:2.5 to 3.5, and the value of c is set within the range 13 to 19 µm.

An optical transmission system of the first arrangement of this invention is characterized in that an optical transmission line of any of the above-described first through fourteenth arrangements is installed and when an optical signal is to be transmitted along this optical transmission line, the optical signal is transmitted upon dividing the optical signal into an optical signal of a first preset wavelength band within a wavelength band of 1570 to 1620 nm and an optical signal of a second preset wavelength band within a wavelength band adjacent the wavelength band of 1570 to 1620 nm.

An optical transmission system of the second arrangement of this invention is characterized in that, in addition to having the arrangement of the above-described optical transmission system of the first arrangement, the optical signal of the first preset wavelength band and the optical signal of the second preset wavelength band are transmitted in mutually opposite directions.

An optical transmission system of the third arrangement of this invention is characterized in that an optical transmission line of any of the above-described second through fourteenth arrangements is formed by connecting the positive dispersion optical fiber, the dispersion characteristics adjustment optical fiber, and the negative dispersion fiber in that order, the terminal part of the positive dispersion optical side of this optical transmission line is used as the input terminal part for an optical signal of a first preset wavelength band within a wavelength band of 1570 to 1620 nm, the terminal part of the negative dispersion optical side of the optical transmission line is used as the input terminal part for an optical signal of a second preset wavelength band within a wavelength band adjacent to 1570 to 1620 nm, and the optical signal of the first preset wavelength band and the optical signal of the second preset wavelength band are transmitted in mutually opposite directions.

An optical transmission system of the fourth arrangement of this invention is characterized in that, in addition to having the arrangement of the above-described optical system of the first, second, or third arrangement, the respective dispersion values and dispersion slopes of the optical fibers that comprise the optical transmission line and the transmission directions of the optical signals are determined so that neither the cumulative dispersion of the optical transmission line with respect to the optical signal of the first preset wavelength band nor the cumulative dispersion of the optical transmission line with respect to the optical signal of the second preset wavelength band will be zero from the point immediately after optical signal input to the termination of the optical transmission line.

With an optical transmission line of any of the first through third arrangements of this invention, the construction of a low-dispersion WDM optical transmission line that is suited for high-speed, large-capacity transmission is enabled by the making of a small wavelength dispersion value at a preset wavelength within the wavelength band of 1570 nm to 1620 nm.

Also, with an optical transmission line of the fourth arrangement, the construction of a low-dispersion WDM optical transmission line that is suited for high-speed, large-capacity transmission is enabled by the making of a small wavelength dispersion value at a preset wavelength within the wavelength band of 1520 nm to 1620 nm.

Furthermore, an optical transmission line of the fifth or sixth arrangement enables the wavelength dependence of the loss to be improved in addition to providing the above-described effects. Thus with the optical transmission line of the fifth or sixth arrangement of this invention, it also becomes possible at the same time to satisfy the requirement of having low dispersion characteristics in the range, 1520 nm to 1570 nm.

Furthermore, with an optical transmission line of the seventh or eighth arrangement of this invention, the construction of a low-dispersion WDM optical transmission line that is suited for high-speed, large-capacity transmission is enabled by the use of a negative dispersion optical fiber, the characteristics of which have been optimized for a wavelength band adjacent to the wavelength band of 1520 nm to 1570 nm, to make the wavelength dispersion value small at a preset wavelength within the: wavelength band of 1520 nm to 1570 nm.

Furthermore, with an optical transmission line of any of the ninth through fourteenth arrangements, the dispersion of the positive dispersion optical fiber or the negative dispersion optical fiber that comprises an optical transmission line of any of the first through eighth arrangements is specified. An optical transmission line of any of the ninth through fourteenth arrangements thus enables an optical transmission line of any of the first through eighth arrangements to be arranged accurately using a positive dispersion optical fiber or a negative dispersion optical fiber as described in the corresponding arrangement.

The negative dispersion optical fiber that is used in an optical transmission line of this invention can specifically realize the arrangement of a negative dispersion optical fiber that is suitable for the above-described transmission lines and, for example, can provide a line-type dispersion compensation optical fiber of low nonlinearity.

And by applying for example the abovementioned line-type dispersion compensation optical fiber as a negative dispersion optical fiber and thereby providing a means for WDM transmission in the L-band, maximal use can be made of such characteristics in L-RDF as low nonlinearity, low loss, and enabling of compensation in the L-band at low PMD. WDM transmission not only in the L-band but in the L-band+C-band as well is enabled by the use of the abovementioned line-type dispersion compensation optical fiber as a negative dispersion optical fiber.

Furthermore, the possibilities of WDM transmission in the L-band are expanded by the provision of an optical transmission line with which WDM transmission in the L-band can be performed using a conventional RDF.

Furthermore, since an optical transmission system that uses an optical transmission line of this invention is an optical transmission system that uses an optical transmission line that exhibits the above-described excellent effects, it can be made an excellent optical transmission system that enables wavelength division multiplexed optical transmission.

Also, with an optical transmission system of this invention, an optical signal in a first preset wavelength band within the wavelength band of 1570 to 1620 nm and an optical signal in a second preset wavelength band within a wavelength band adjacent to the wavelength band of 1570 to 1620 nm are set. Since the optical transmission system of this invention transmits an optical signal to be transmitted upon dividing the signal into the abovementioned optical signals of the first preset wavelength band and second preset wavelength band, the optical signal of the first preset wavelength band can for example be amplified by an optical amplifier for amplification in that wavelength band and the optical signal of the second preset wavelength band can be amplified by an optical amplifier for amplification in that wavelength band. An optical transmission system of this invention can thus perform wavelength division multiplexed transmission, etc. accurately.

Furthermore, with an optical transmission system of the second or third arrangement of this invention, since the optical signal of the first preset wavelength band and the optical signal of the second preset wavelength band are transmitted in mutually opposite directions, the overlapping of the signal optical power of the first preset wavelength band with the signal optical power of the second preset wavelength band can be repressed, to thereby restrict the occurrence of nonlinear phenomena, etc.

Also, with an optical transmission system of the second or third arrangement of this invention, an optical system with which neither the cumulative dispersion of the optical transmission line with respect to the optical signal of the first preset wavelength band nor the cumulative dispersion of the optical transmission line with respect to the optical signal of the second preset wavelength band will be zero from the point immediately after optical signal input to the termination of the optical transmission line can be arranged as in an optical transmission system of the fourth arrangement of this invention. By arranging an optical transmission system thus, since the optical signals of the first and second preset wavelength bands will not have to pass through a point at which the dispersion at the signal optical wavelength is zero, waveform distortion due to nonlinear phenomena can be restricted even more concretely.

BRIEF DESCRIPTION OF THE DRAWINGS

FIG. 3 is an arrangement diagram, which shows another example of the refractive index profile of a negative dispersion optical fiber used in an optical transmission line of this invention.

FIG. 10 shows graphs with (a) showing the cumulative dispersion characteristics for an optical signal of a wavelength within the first preset wavelength band of the abovementioned optical transmission system of the first embodiment and (b) showing the cumulative dispersion characteristics for an optical signal of a wavelength within the second preset wavelength band of this optical transmission system, FIG. 12 shows graphs with (a) showing the cumulative dispersion characteristics for an optical signal of a wavelength within the first preset wavelength band of the abovementioned optical transmission system of the second embodiment and (b) showing the cumulative dispersion characteristics for the optical signal of a wavelength within the first preset wavelength band in the case where the dispersion characteristics adjustment optical fiber has been omitted from this optical transmission system.

DESCRIPTION OF THE PREFERRED EMBODIMENTS

In order to describe the present invention in more detail, the invention shall now be described based on embodiments of the invention and in reference to the attached drawings.

Figure 1:
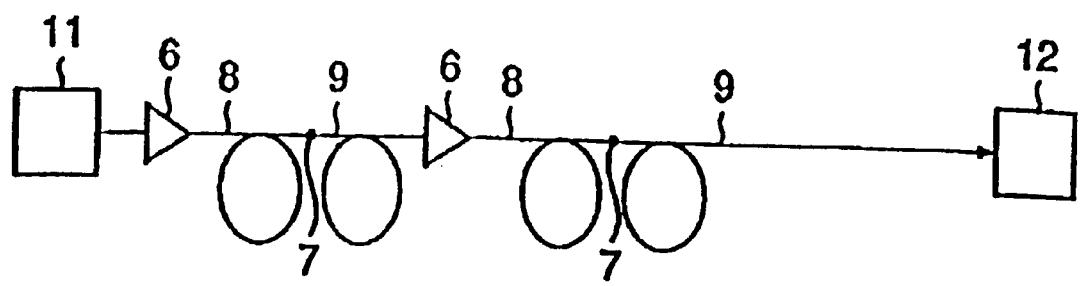
FIG. 1 is a block diagram, which shows a first embodiment of an optical transmission line of this invention.

FIG. 1 is a schematic diagram of an optical transmission line of a first embodiment of this invention. In FIG. 1, 31 is an optical signal sending device, 32 is an optical amplification device, 33 is an SMF, 34 is an L-RDF, and 35 is an optical signal receiving device. Thus with the optical transmission line of this embodiment, a block is comprised by connecting optical amplification device 32, SMF 33, and L-RDF, in that order, and one or more of such blocks are inserted between optical signal sending device 31 and optical signal receiving device 31. The optical amplification device 32 adjacent optical signal sending device 31 may be incorporated inside optical signal sending device 31.

In this embodiment, SMF 33 functions as a positive dispersion optical fiber, with which the dispersion value and the dispersion slope in a preset wavelength band within the wavelength band of 1570 to 1620 nm (L-band) are both positive. L-RDF 34 functions as a negative dispersion optical fiber that compensates the dispersion and dispersion slope of SMF 33 in the abovementioned preset wavelength band. With L-RDF 34, the dispersion value and dispersion slope value within 1520 to 1620 nm (C-band+L-band) are both negative.

The present embodiment is characterized in that by connecting these SMF's 33 and L-RDF's 34, the dispersion value of the optical transmission line as a whole is made greater than or equal to −1 ps/nm/km and less than or equal to 1 ps/nm/km in the abovementioned preset wavelength band.

As has been mentioned above, since priorly developed DCF's and RDF's were all developed only in consideration of the dispersion of SMF's in the C-band, it was difficult to accurately compensate the dispersion of SMF's in the L-band. The present inventor considered it essential to propose a new dispersion compensation optical fiber for compensating the dispersion value and dispersion slope of SMF's in the L-band in order to construct a new optical transmission line for WDM transmission in the L-band. The examination that the present inventor has carried out to determine the arrangement of the new dispersion compensation optical fiber shall now be described.

An SMF has a positive dispersion value in the wavelength band of 1520 to 1620 nm and dispersion of approximately 15 to 25 ps/nm/km in the L-band. If there is residual dispersion in the optical transmission line as a whole, degradation of the signal waveform will occur due to this residual dispersion. This inventor thus considered that the new dispersion compensation optical fiber, which is to comprise the new optical transmission line for WDM transmission in the L-band, had to have a negative dispersion value that will cancel out the dispersion of the SMF in the L-band.

Also, an SMF generally has a positive dispersion slope, for example, of approximately 0.05 ps/nm2/km in the L-band. With regard to WDM transmission in the L-band, the new dispersion compensation optical fiber preferably is made to have a negative slope in the L-band. By doing so, a low dispersion, for example, of within ±1 ps/nm/km and preferably within about ±0.5 ps/nm/km can be obtained in the wide bandwidth of the L-band with the total optical transmission line (optical transmission line as a whole) in which an SMF is connected with an RDF. When this is realized, the optical transmission line can be used (for WDM transmission) over a wide wavelength range.

Also, even when the dispersion of an optical transmission line as a whole and the degradation of the waveform due to FWM are restricted, if the mode field diameter (shall be referred to hereinafter as "MFD") of the optical fiber is small or if the nonlinear refractive index is large, the degradation of the signal waveform will tend to occur readily due to cross phase modulation (XPM) or self phase modulation (SPM). With prior-art, module-type dispersion compensation optical fibers (DCF), which have been developed to compensate the positive dispersion of SMF's, the MFD in the L-band is generally greater than the MFD in the C-band. The use of a prior-art DCF for the L-band is thus advantageous in regard to this point. However presently, even though the MFD of a DCF is greater in the L-band than in the C-band, it is still too small to restrict nonlinear phenomena.

The present inventor thus considered that a line-type dispersion compensation optical fiber (RDF type), which is larger in MFD and lower in nonlinearity than a DCF, will be more preferable as a new type of dispersion compensation optical fiber. An RDF also provides the merits of being lower in transmission loss than a DCF and being low in polarization mode dispersion (shall be referred to hereinafter as "PMD"). A DCF may be used in place of an RDF for dispersion compensation of an SMF, depending on the conditions of the optical signal that is transmitted, the transmission distance, etc.

Priorly, when using a prior-art RDF, which is used for dispersion compensation of an SMF in the C-band, an RDF of a length of approximately ⅓ to 1 times the length of the SMF was connected to the SMF. Thus with this invention, it was decided that in using a new RDF (L-RDF) for dispersion compensation of an SMF in the L-band an L-RDF of a length of approximately ⅓ to 1 times the length of the SMF be connected. In order to perform dispersion compensation of an SMF in the L-band with this length, the dispersion value of the L-RDF in the L-band should preferably be in the range, −15 to −75 ps/nm/km.

The above-described nonlinear phenomena become extremely significant when the power of the light is strong. Thus in arranging an optical transmission line by connecting an SMF with an L-RDF, it is considered effective to connect the output side of an optical amplifier to the input side of the SMF, which is fiber that is lower in nonlinearity, and connecting the RDF to the output side of the SMF. With this order of connection, the light will be weakened by passage through the SMF and the weakened light will then pass through the L-RDF, which is an optical fiber that is higher in nonlinearity than the SMF.

Figure 2:
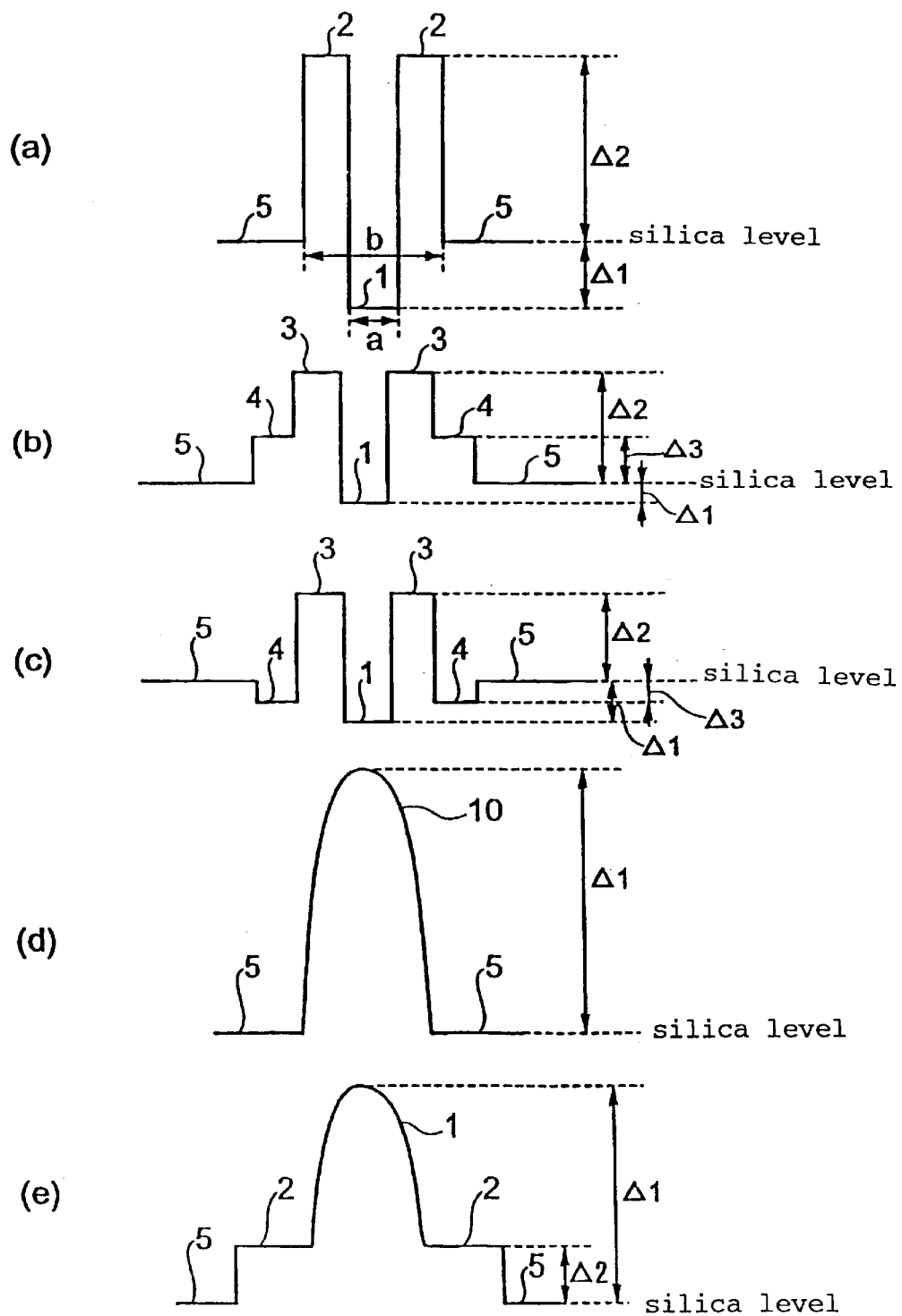
FIG. 2 is an arrangement diagram, which shows an example of the refractive index profile of a negative dispersion optical fiber used in an optical transmission line of this invention.

In order to optimize the profile structure of an L-RDF for meeting the abovementioned characteristics, the present inventor carried out the following examination. First, a three-layer profile, such as that shown in FIG. 2, was used as the basic structure for optimization of the specific structure. In FIG. 2, 1 is a center core, 2 is a side core, and 3 is a cladding, and this optical fiber is formed by surrounding center core 1 with the side core and surrounding side core 2 with cladding 3. This type of three-layer profile has a negative dispersion slope in the L-band and the structure thereof is simple. This type of three-layer profile has thus been noted as a profile with which DCF's and RDF's can be manufactured readily.

Here, the specific differential refractive indices were defined based on the cladding part of the three-layer structure. The specific differential refractive index of center core 1 based on cladding 3 was indicated as Δ1, the specific differential refractive index of side core 2 based on cladding 3 was indicated as Δ2, and RΔ was defined as RΔ=Δ2/Δ1. Also, the diameter of center core 1 was indicated as a, the diameter of side core 2 was indicated as b, and Ra was defined as Ra=a/b. The optimization of the combinations of these values was then examined.

First, in the determination of the dispersion value, the RΔ, which is considered to be the most important factor, was optimized. With a DCF (module-type dispersion compensation optical fiber), it is known that the setting of RΔ to approximately −0.3 will be unproblematic to manufacture (will not present problems) and will also enable a high compensation factor to be realized regardless of the value of Δ1. The value of RΔ was thus fixed (=−0.3) and then the optimal values of Δ1 and Ra were considered. Since the achieving of low nonlinearity is being currently stressed, the examination was centered on making Δ1 small and the MFD large.

The variations of the characteristics at a wavelength of 1590 nm with respect to the value of Ra when RΔ is fixed at −0.3 and Δ1 is fixed at 1.1% are shown in Table 1. It was premised that the dispersion and dispersion slope were approximately 100% compensated.

TABLE 1

| Ra Units | Core diameter μm | λc nm | Dispersion ps/nm/km | Slope ps/nm²/km | MFD μm | Aeff μm² | β/k |
|---|---|---|---|---|---|---|---|
| 0.35 | 15.58 | 780 | −14.34 | −0.038 | 5.54 | 22.65 | 1.44532 |
| 0.40 | 14.75 | 794 | −16.70 | −0.044 | 5.58 | 23.06 | 1.44551 |
| 0.45 | 13.39 | 805 | −20.91 | −0.055 | 5.65 | 23.78 | 1.44559 |
| 0.50 | 12.66 | 810 | −25.32 | −0.067 | 5.76 | 24.60 | 1.44560 |
| 0.55 | 11.02 | 802 | −30.73 | −0.081 | 5.81 | 25.27 | 1.44552 |
| 0.60 | 9.98 | 798 | −34.82 | −0.092 | 5.87 | 25.96 | 1.44541 |

As is clear from Table 1, in order to realize low nonlinearity and a high propagation refractive index (β/k; an index that expresses the quality of the propagation conditions), the value of Ra must be set within the range of about 0.45 to 0.55. Next, the Ra was fixed at 0.5 and the RΔ was varied to see if RΔ=−0.3 is really optimal. As a result, it was found that the propagation conditions are optimized near RΔ=−0.38.

Next, the variations of the dispersion and MFD when Δ1 is varied within the above profile range were examined. Ra and RΔ were adjusted finely within a range close to the abovementioned values so that the high compensation factor and low bending loss will be maintained. It was found that generally when Δ1 is increased, the MFD decreases, the dispersion increases, and the cutoff wavelength also tends to increase.

The profile was then determined based on the above observations. First, the upper limit of Δ1, with which an MFD of 5.5 μm or more can be obtained, will be 1.4%. Meanwhile, if the cutoff wavelength falls to 800 nm or less, the bending loss will generally increase. The lower limit of Δ1, for which the bending loss will not become 10 db or more for a diameter of 20 mm, will thus be 1.0%. For the respective profiles, the core diameter was determined to be within a range (10.5 μm to 14.0 μm) in which the dispersion and dispersion slope will be compensated adequately.

As a result, a new RDF (L-RDF), having a dispersion value and dispersion slope of signs opposite those of the SMF in the L-band and can substantially cancel out the dispersion value and dispersion slope of the same values, was obtained with the three-layer profile.

Within the above-described profile range, the dispersion characteristics in the C-band will also be such that the dispersion and dispersion slope will be negative. Since the L-RDF obtained with the above-described three-layer profile has a compensation factor as determined by equation (2) of 60% or more, this L-RDF was confirmed to be able to perform simultaneous compensation in the C-band to some degree as well.

$$\text{Compensation factor } (\%) = \{(S_{RDF}/S_{SMF})/(D_{RDF}/D_{SMF})\} \quad (2)$$

Equation (2) applies the above-described equation (1), and in equation (2), SRDF is the dispersion slope of the RDF, DRDF is the dispersion value of the RDF, and DSMF and SSMF are respectively the same as those of equation (1). Each of these values was deemed to be a value in the C-band or at an arbitrary wavelength within the C-band in determining the compensation factor in the C-band.

Next, a four-layer profile, such as that shown in FIG. 3, was used as a basic structure for optimization of the specific structure. With this four-layer profile, a portion that is higher in refractive index than the cladding is provided at the outer part of the above-described three-layer profile. A four-layer profile, like the three-layer profile, is anticipated as a profile which can provide a negative dispersion and negative slope in the L-band and enable low nonlinearity and good bending loss characteristics to be realized.

The specific differential refractive indices were defined based on the cladding part of this profile. The specific differential refractive index of center core 21 based on cladding 24 was indicated as Δ1, the specific differential refractive index of first side core 22 based on cladding 24 was indicated as Δ2, and the specific differential refractive index of second side core 23 based on cladding 24 was indicated as Δ3. Also, the diameter of center core 21 was indicated as a, the diameter of first side core 22 was indicated as b, and the diameter of second side core 23 was indicated as c. The optimization of the combinations of these values was then examined.

First, in the determination of the dispersion value, the depth of Δ2, which is considered to be the most important factor, was optimized. It is known that in a DCF, when the absolute value of Δ2 becomes large, the DCF becomes strong to bending and moreover a high compensation factor can be obtained. However, if Δ2 is made too large, there is a tendency for the bending properties to become weak suddenly from a certain point on. The value of Δ2/Δ1 was thus set to a value (=−0.3), which is considered to be the optimal value at which a high compensation factor of nearly 100% can be obtained with conventional DCF's, and the optimal values of Δ1, Δ3, and a:b:c were considered. Since attention is being paid to making the nonlinearity low in the present case, the examination was centered around making the Δ1 small (and thus the nonlinear refractive index (shall be referred to hereinafter as "n2") small) and the MFD large.

Table 2 shows the variations of the characteristics at 1590 nm with respect to the value of Δ3 when Δ1 is fixed at 1% and a:b:c is fixed at a:b:c=1:2:3. It can be clearly understood from Table 2 that in order to realize low nonlinearity, that is, a large MFD and a high propagation refractive index (β/k; an index that expresses the quality of the propagation conditions) of 1.4456 or more, the value of Δ3 must be set within the range of about 0.25%. It can also be seen that since Δ2/Δ21 is set to a value (=−0.3), which is considered to be optimal for conventional DCF's, a large, negative dispersion and dispersion slope are obtained.

TABLE 2

| Δ3 % | Core diameter μm | λc nm | Dispersion ps/nm/km | Slope ps/nm²/km | MFD μm | Aeff μm² | β/k |
|---|---|---|---|---|---|---|---|
| 0.15 | 17.2 | 1168 | −17.3 | −0.040 | 6.22 | 30.6 | 1.44554 |
| 0.20 | 16.7 | 1339 | −24.8 | −0.066 | 6.78 | 34.0 | 1.44558 |
| 0.25 | 16.3 | 1485 | −37.6 | −0.085 | 6.95 | 42.8 | 1.44562 |
| 0.30 | 16.0 | 1570 | −41.3 | −0.106 | 6.71 | 38.3 | 1.44559 |

Next, the value of Δ2/Δ1 and the value of Δ3 were fixed at −0.3 and 0.25%, respectively, and Δ1 was varied to examine the optimal value. The diameter ratio, a:b:c was adjusted so that the compensation factor will be nearly 100%.

The variation of the dispersion and the MFD when Δ1 is varied was examined. Generally when Δ1 is decreased, the MFD increases, the dispersion becomes small, and the cutoff wavelength also decreases. Here, the Δ1, for which there is the possibility for increasing MFD to 5.5 μm or more in the range in which the cutoff wavelength will satisfy the single mode condition and the bending loss for a diameter of 20 mm will not present a problem for making a cable, will be approximately 0.9 to 1.5%.

It was also found that if a bending loss of up to about 10 db/m is allowed for a diameter of 20 mm in the above range, an MFD of 6.5 μm or more is achievable. Here, the value of a:b:c was changed so that the normal dispersion value and dispersion slope of an SMF in the L-band can be compensated completely.

As a result, an extremely large dispersion slope was obtained when the value of a:b was 1:2 to 1:2.5. Also, when the value of a:c is 1:2.5 to 3, the large, negative dispersion slope will be maintained, the bending loss will not increase, and yet the cutoff wavelength will be maintained at 1550 nm or less. The diameter ratio (a:b:c) was thus set to 1:2 to 2.5:2.5 to 3.

From the above observations, it was found that satisfactory results could be obtained when Δ1 is set to 0.9% to 1.5%, Δ2 is set to −0.2% to −0.5%, Δ3 is set to 0.2 to 0.3%, and a:b:c is set to 1:2 to 2.5:2.5 to 3.5. The characteristics of the above-described profile was then examined for the range of the α constant of the core shape of 1 to infinity (triangular to stepped).

As a result, it was found that a solution exists with which the slope characteristics are good and the bending loss for a diameter of 20 mm will not become greater than or equal to 10 dB/m in the range, α=1.5 to 3. It was also found that when the α constant is set to 1.5 or less, the bending loss increases and that when a is set to 3 or more, the absolute value of the dispersion slope becomes extremely small. It was thus found that extremely good characteristics can be obtained for an L-RDF, even in the case of a four-layer profile, in the above range.

When the core diameter was set to a value at which the compensation factor will be good for each of the profiles, the core diameter became 13.0 to 19.0 μm. Also as with the three-layer profile, a negative dispersion and dispersion slope were obtained in the C-band with an L-RDF with a four-layer profile as well. Since a four-layer profile L-RDF also provides a high compensation factor of 70% or more, it was found to enable simultaneous WDM transmission in the C-band as well.

Based on the above-described examination results, the present inventor applied an L-RDF of the above arrangement as the negative dispersion optical fiber for forming the optical transmission line of the present embodiment and formed the optical transmission line of the arrangement shown in FIG. 1.

The effective cross-sectional area of the core (shall be referred to hereinafter as "Aeff") of an L-RDF is generally enlarged in comparison to that of a C-DCF (a conventional, module-type dispersion compensation optical fiber for C-band compensation) or a C-RDF (a conventional, line-type dispersion compensation optical fiber for C-band compensation). However, the Aeff of an L-RDF is still approximately one-third that of a general SMF. Thus as shown for example in FIG. 1, the system arrangement employed was one in which, following the optical amplification device 32, SMF 33 is inserted first and then an L-RDF 34 is inserted. It is considered that nonlinear phenomena can be restricted by this arrangement.

That is, with this arrangement, high power light immediately after amplification by the amplifier is made to enter the SMF. Since the SMF is low in nonlinearity, nonlinear phenomena will be restricted. Since the light the power of which has been attenuated by the SMF is then made to enter the L-RDF, the nonlinear phenomena in the L-RDF will also be restricted. Also, since the SMF and L-RDF mutually cancel out the dispersion and dispersion slope in the L-band and the C-band, flat and low dispersion characteristics can be obtained in the L-band (or the L-band and the C-band). From such characteristics, it can be said that this system is suited for WDM transmission.

That is, this new type of RDF line is a fiber that can become the mainstream for WDM transmission in the future, and by the completion of the profile with which such a fiber can be realized, it has become possible to readily manufacture fibers suited for high-speed, large-capacity transmission.

Figure 4:
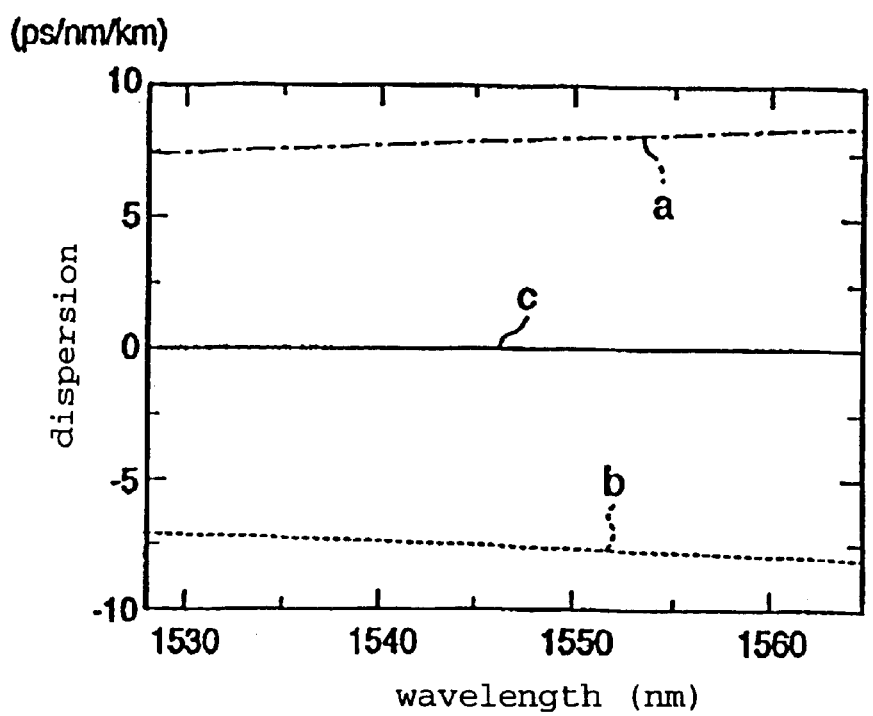
FIG. 4 is a block diagram, which shows a second embodiment of an optical transmission line of this invention.

A second embodiment of a optical transmission line by this invention is shown in FIG. 4. In FIG. 4, 41 is an optical signal sending device, 42 is an optical amplification device, 43 is an SMF, 44 is a DSF (dispersion shift optical fiber), 45 is a C-RDF, and 46 is an optical signal receiving device.

In this second embodiment, SMF 43 functions in the same manner as SMF 33 of the above-described first embodiment. That is, SMF 43 functions as a positive dispersion optical fiber with which both the dispersion value and dispersion slope in a preset wavelength band within the wavelength band of 1570 to 1620 nm are positive. Also, C-RDF 45 functions as a negative dispersion optical fiber that compensates the dispersion and dispersion slope of SMF 43 in a wavelength band (the wavelength band of 1520 to 1570 nm in the present case) adjacent to the wavelength band of 1570 to 1620 nm. Furthermore, DSF 44 functions as a dispersion characteristics adjustment optical fiber, which compensates the dispersion and dispersion slope in the abovementioned preset wavelength band of the optical fiber connection unit formed by connecting C-RDF 45 and SMF 43.

This second embodiment is characterized in that by the formation of an optical transmission line by the connection of these SMF's 43, C-RDF's 45, and DSF's 44, the dispersion value of the optical transmission line as a whole is made greater than or equal to −1 ps/nm/km and less than or equal to 1 ps/nm/km in the abovementioned preset wavelength band.

DSF 44 is a dispersion shift optical fiber with zero dispersion in the wavelength band 1520 nm to 1620 nm and has a positive dispersion slope in this wavelength band. A general DSF, having a zero dispersion wavelength close to 1550 nm for example, is employed as DSF 44. Also, a DSF, which is relatively suited for WDM transmission in the 1550 nm band, that is for example, a DSF, with which the zero dispersion wavelength is shifted by 20 nm or more from 1550 nm, may be used as DSF 44.

C-RDF 45 is an RDF that has a negative dispersion slope and can compensate both the dispersion and dispersion slope of SMF 43 in the C-band. In FIG. 4, a C-DCF may be applied in place of C-RDF 45 as the abovementioned negative dispersion optical fiber.

With the method described up until now, WDM transmission in the L-band will not be enabled with an optical transmission line using a conventional RDF (or a DCF with a negative dispersion slope). However, by using an optical transmission line with an SMF 43+DSF 44+C-RDF 45 (or C-DCF) arrangement, such as shown in FIG. 4, WDM transmission in the L-band will be enabled even if a conventional dispersion compensation optical fiber is used.

Figure 13:
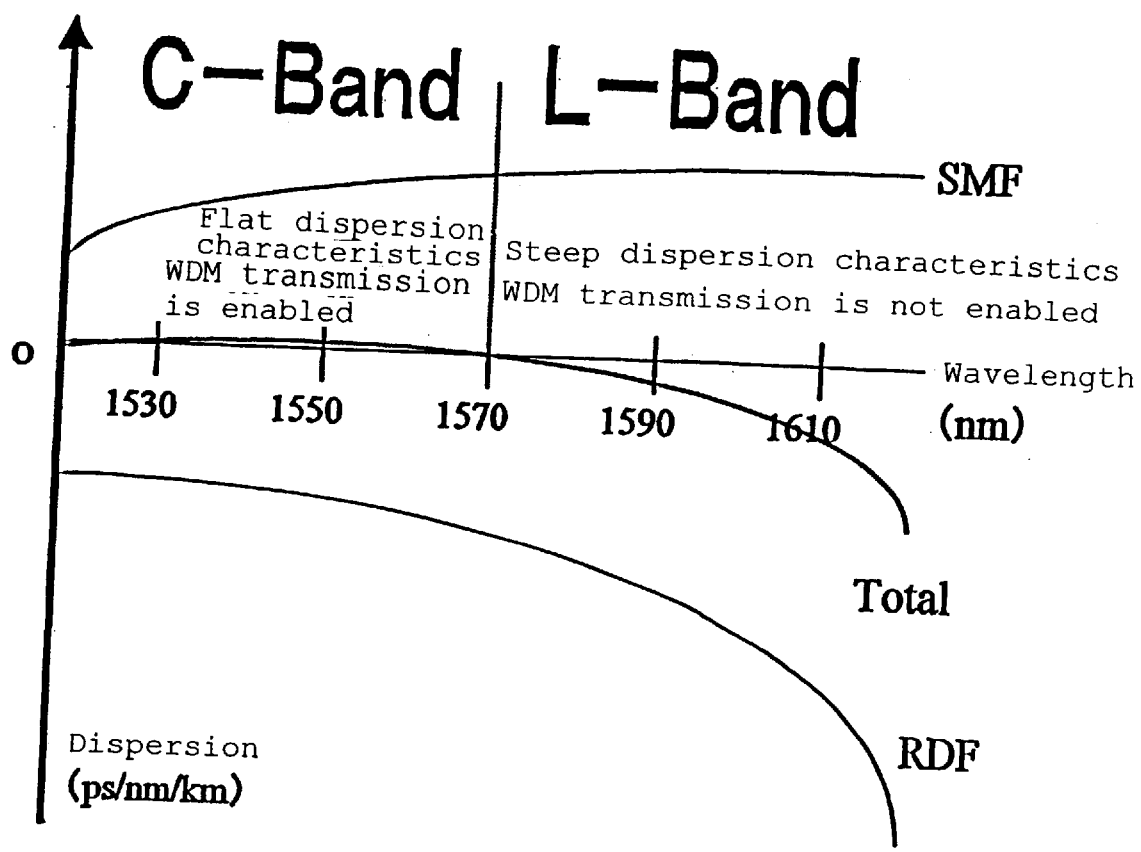
FIG. 13 is an explanatory diagram, which shows the wavelength dependence of the dispersion characteristics of a prior-art wavelength division multiplexed optical transmission line.

The reason is as follows. That is, when a conventional dispersion compensation optical fiber is used in the L-band, the wavelength dependence of the dispersion characteristics in the L-band will be such that the negative dispersion and dispersion slope will be large as shown in FIG. 13. However, the wavelength dependence of the dispersion characteristics of a DSF will be inverse to the wavelength dependence of the dispersion characteristics in the L-band shown in FIG. 13. Thus by connecting the abovementioned DSF of just the length by which the wavelength dependence of the dispersion characteristics of the optical transmission line as a whole can be made small, an optical transmission line can be obtained that will enable WDM transmission and with which the wavelength dependence of the dispersion characteristics will be small.

With regard to the order of the fibers in the optical transmission line, the order, SMF 43, which has a zero dispersion wavelength in the 1.31 μm band, DSF 44, which has a zero dispersion wavelength in the 1.55 μm band, and C-RDF 45, is desirable. When these optical fibers are connected in this order to form an optical transmission line, nonlinear phenomena can be avoided. Furthermore, the MFD of DSF 44 is preferably set to approximately 8 μm since the connection loss due to the MFD difference in the fusion process can be lessened. Or, DSF 44 may be connected as a short-length (for example, of a few km) module to the optical signal receiving device side of the optical transmission line, that is for example, the optical signal receiving device side of C-RDF 45 in FIG. 4.

Figure 5:
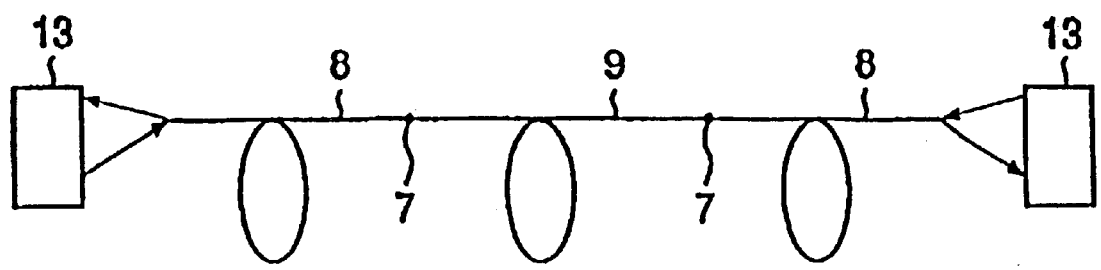
FIG. 5 is an explanatory diagram, which illustrates the concepts of compensation of the wavelength dependence of the loss characteristics of a wavelength division multiplexed optical transmission line by this invention.

However, with a conventional RDF for the C-band or a conventional DCF for the C-band, increased loss may occur due to the leaky mode. Thus in order to solve this problem, a function for compensating the wavelength dependence of the transmission line is added in FIG. 4 to the optical transmission line in which SMF 43, DSF 44, and C-RDF 45 (or C-DCF) are combined. FIG. 5 shows a conceptual diagram of the compensation of the wavelength dependence of transmission loss. FIG. 5 illustrates the concept of compensating the curve of the wavelength dependence of transmission loss by the abovementioned function and does not illustrate the transmission loss values precisely. That is, as shown by the "Total" curve in this Figure, the abovementioned function provides flat loss characteristics that do not depend on the wavelength from the C-band to the L-band and thereby enables WDM transmission.

As an example of a function for the abovementioned compensation of the wavelength dependence of transmission loss, an optical wave mixer/divider may be connected in the abovementioned optical transmission line so that the wavelength dependence of transmission loss of this optical transmission line will be compensated. In this case, arrangements are made so that the optical path lengths of the respective branch ports of the optical wave mixer/divider will differ or so that an axial shift will occur for each branch port.

As an example that differs from the above, the wavelength dependence of transmission loss may also be compensated by using a Mach Zehnder interferometer so that the optical path length will differ for each wavelength.

As yet another example, the wavelength dependence of transmission loss may also be compensated by using the reflectivity of a single etalon plate, etc. or by combining the reflectivities of a plurality of etalon plates, etc. Other methods that can compensate the wavelength dependence of transmission loss may also be applied to the present invention.

EXAMPLES

The effectiveness of the optical transmission line of this invention and the negative dispersion optical fiber used in this optical transmission line shall now be confirmed by way of examples. Prototypes were made in reference to simulation results. The diameter ratios and Δ's were set close to the optimal values determined by simulation and the attainment of both low nonlinearity and high compensation factor at the same time was aimed at by making Δ1 small. The two profiles shown in Table 3 were selected based on the simulation results.

TABLE 3

| Type | Δ1 | α | Δ2 | Δ3 | a:b(a:b:c) | Core diameter |
|------|-----|-----|-------|--------|------------|---------------|
| Three-layer type | 1.15% | 2.1 | −0.43% | — | 1:2.1 | 10.4 μm |
| Four-layer type | 1.08% | 2.4 | −0.39% | −0.25% | 1:2.2:2.7 | 10.4 μm |

Prototypes with profiles close to the above profiles were made. The results of the prototypes are shown in Table 4.

TABLE 4

| Units | Fiber length km | Transmission loss @ 1590 nm dB/km | Dispersion @ 1590 nm ps/nm/km | Dispersion slope @ 1590 nm ps/nm²/km | MFD @ 1590 nm μm | Bending loss 20 φ dB/m | λc nm | Compensation factor @ 1550 nm |
|---|---|---|---|---|---|---|---|---|
| Three-layer #1 | 20.0 | 0.245 | −19.1 | −0.040 | 5.80 | 2.9 | 847 | 53.0 |
| Three-layer #2 | 22.0 | 0.250 | −27.1 | −0.065 | 5.84 | 5.8 | 834 | 60.7 |
| Three-layer #3 | 22.0 | 0.230 | −31.1 | −0.078 | 5.89 | 9.2 | 829 | 74.9 |
| Four-layer #1 | 10.0 | 0.245 | −18.8 | −0.052 | 6.07 | 1.9 | 1336 | 61.3 |
| Four-layer #2 | 10.0 | 0.230 | −24.2 | −0.070 | 6.15 | 3.5 | 1310 | 73.8 |
| Four-layer #3 | 19.0 | 0.240 | −29.4 | −0.075 | 6.23 | 5.3 | 1294 | 79.7 |

The results show that the L-RDF of this invention provides a high compensation factor in the L-band when connected to an SMF at a diameter ratio of approximately 1:1 to 1:3 as has been described above. It is clear from the above results that a line-type dispersion compensation optical fiber (which can be applied as an optical transmission line), which has a dispersion value and dispersion slope of the opposite sign and of nearly the same absolute values as those of the SMF, is realized by the L-RDF. The loss is also restricted to a low level. Also, since a large MFD value of 5.8 μm or more is obtained and moreover since Δ1 is small, low nonlinearity is realized. Furthermore, a compensation factor is maintained at a level (50% or more) at which there will be no problems for practical use in the 1550 nm band as well, showing that simultaneous WDM transmission along with transmission in the C-band is enabled.

Figure 6:
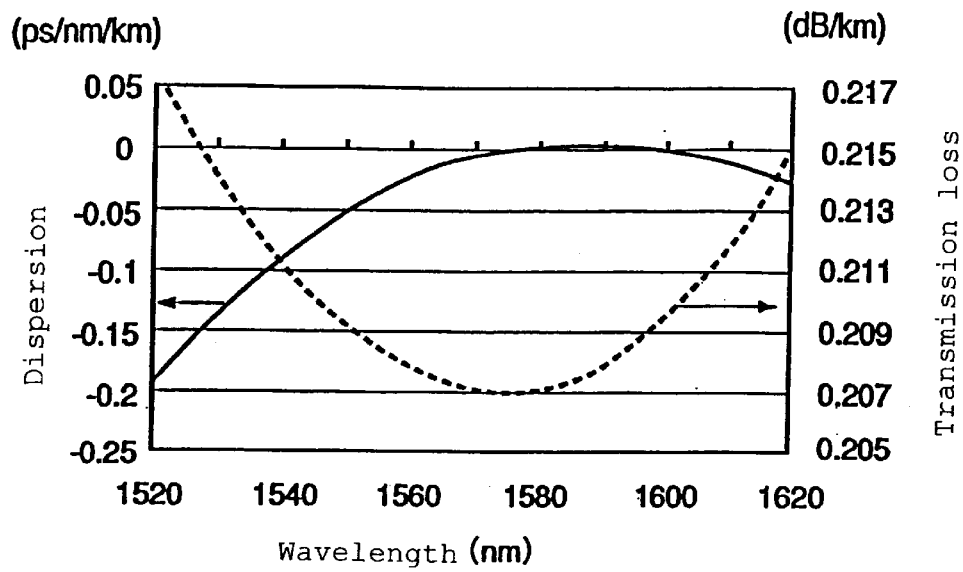
FIG. 6 is an explanatory diagram, which shows examples of the wavelength dependence of the dispersion characteristics and the wavelength dependence of the loss characteristics of an optical transmission line of this invention.

An example of the wavelength dependence of the dispersion characteristics and loss characteristics when the L-RDF of Table 4 is connected to an SMF is shown in FIG. 6. Compensation is not only accomplished in the L-band but to some degree in the C-band as well, indicating the possibility of WDM transmission in the L-band (or L-band+C-band). An adequately low average transmission loss of approximately 0.21 dB/km was obtained with this optical transmission line.

Also, an optical transmission line, having a DSF 44, which serves as an optical transmission line that has zero dispersion in the range of 1520 to 1620 nm and has a positive dispersion slope in the 1520 to 1620 nm range, inserted between C-RDF 45 and SMF 43, was prepared and its effect was checked.

With a conventional optical transmission line, that is, an optical transmission line arranged from SMF 43 and C-RDF 45, the L-band dispersion characteristics exhibit a steep, negative dispersion slope as shown in FIG. 13. However, when a DSF 44 with an MFD of approximately 8 μm is connected between SMF 43 and C-RDF, the dispersion characteristics in the L-band were flattened. It was thus shown that an optical transmission line having a DSF 44 in between exhibits flatter dispersion characteristics.

Figure 7:
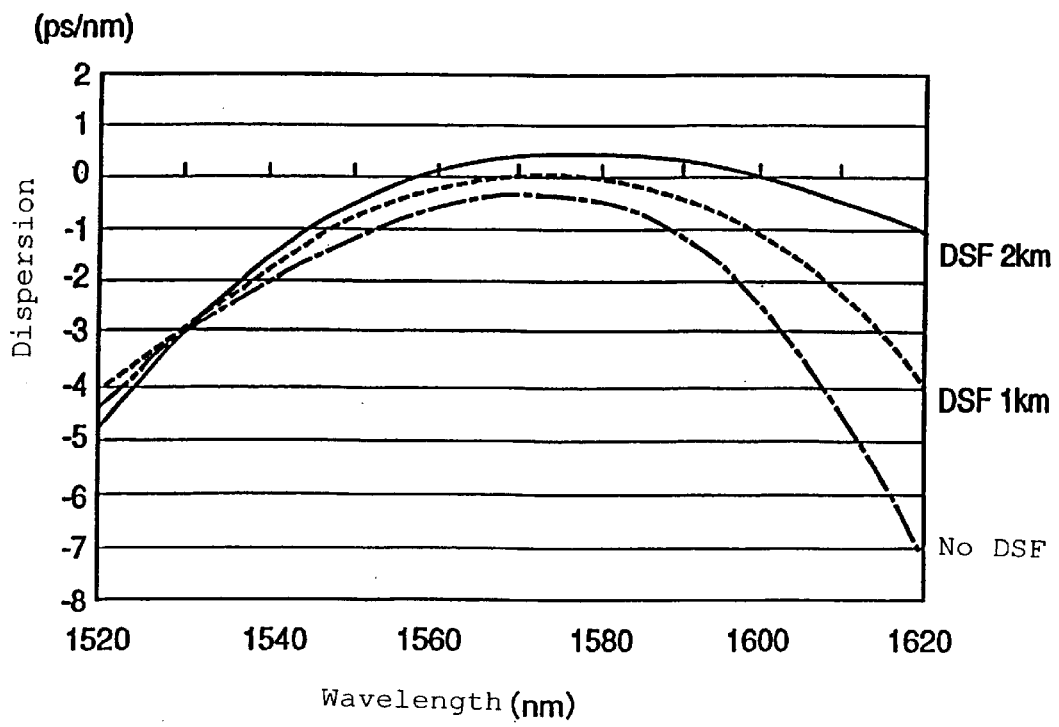
FIG. 7 is an explanatory diagram, which shows an example of the wavelength dependence of the dispersion characteristics of an optical transmission line of this invention.

FIG. 7 shows an example of the wavelength dependence of dispersion in the case where a DSF is inserted in an optical transmission line arranged so that SMF 43 has a length of 20 km and the C-RDF has a length of 20 km. It can be clearly understood that flat dispersion characteristics are obtained by connecting the DSF.

Figure 8:
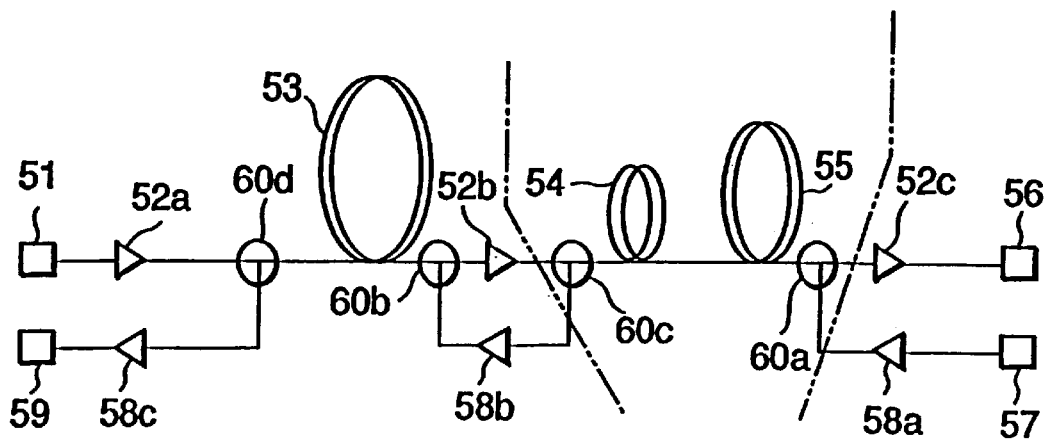
FIG. 8 is a block diagram, which shows an optical transmission system of a first embodiment of this invention.

An embodiment of an optical transmission system that uses an optical transmission line of this invention shall now be described. FIG. 8 shows a first embodiment of an optical transmission system of this invention. With the optical transmission system of this embodiment, an optical transmission line is formed by connecting an SMF 53, a dispersion characteristics adjustment optical fiber 54, and a DCF 55, in that order.

Also in this Figure, 51 and 57 indicate optical signal sending devices, 56 and 59 indicate optical signal receiving devices, 52a to 52c indicate optical amplification devices for amplification in the L-band, 58a to 58c indicate optical amplification devices for amplification in the C-band, and 60a to 60d indicate circulators. At least one of the optical amplification devices 52b, 52c, 58b, and 58c may be omitted in some cases.

The optical transmission system of this embodiment is characterized first of all in having an arrangement in which, when an optical signal is transmitted along the optical transmission line, this optical signal is transmitted upon division into an optical signal of a first preset wavelength band and an optical signal of a second preset wavelength band. To be more specific, the optical transmission system of this embodiment transmits an optical signal of a first preset wavelength band, which is sent from optical signal sending device 51, and an optical signal of a second preset wavelength band, which is sent from optical signal sending device 57, in mutually opposite directions.

The abovementioned optical signal of the first preset wavelength band is an optical signal in the wavelength band of 1570 to 1620 nm (L-band), and in the present embodiment, this optical signal is a signal of 1575 to 1620 nm. The abovementioned optical signal of the second preset wavelength band is an optical signal in a wavelength band adjacent to the wavelength band of 1570 to 1620 nm, and in the present embodiment, this optical signal is a C-band signal.

Also in order to transmit the optical signal of the first preset wavelength band and the optical signal of the second preset wavelength band in mutually opposite directions as mentioned above, the terminal part of the SMF 53 side is used as the optical signal input terminal part for the first preset wavelength and optical signal sending device 51 is connected thereto. Also, the terminal part of the DCF 55 side is used as the optical signal input terminal part for the second preset wavelength and optical signal sending device 57 is connected thereto.

The abovementioned circulators 60a and 60b have the function of transmitting the optical signal of the second preset wavelength band to the DCF 55 and SMF 53 sides, respectively. Circulators 60c and 60d transmit the optical signal of the second preset wavelength band among the transmitted signals to the optical amplification devices 58b and 58c. WDM couplers with a wavelength division function can be used in place of circulators as 60a to 60d.

In the present embodiment, the SMF 53, DCF 55, and dispersion characteristics adjustment optical fiber 54, which comprise the optical transmission line, have the following functions, respectively. That is, SMF 53 functions as a positive dispersion optical fiber with which both the dispersion value and dispersion slope in a preset wavelength band within the wavelength band of 1570 to 1620 nm are positive. DCF 55 functions as a negative dispersion optical fiber that compensates the dispersion and dispersion slope of SMF 53 in a wavelength band adjacent to the wavelength band of 1570 to 1620 nm. DCF 55 has a negative dispersion and negative dispersion slope of large absolute values.

Furthermore, dispersion characteristics adjustment optical fiber 54 has the function of compensating the dispersion and dispersion slope in the abovementioned preset wavelength band of the optical fiber connection unit formed by connecting DCF 55 and SMF 53. In the present embodiment, since stress is laid on compensating the dispersion slope, a dispersion characteristics adjustment optical fiber 54, which is small in the dispersion value itself, is used. With this embodiment, SMF 53 maybe used as the optical transmission line, and the portion (dispersion characteristics adjustment optical fiber 54, DCF 55, and circulators 60a and 60c) delineated by the dotted line in the Figure may be installed as a DCF module at relay points of the optical transmission line.

Table 5 shows the fiber lengths and the dispersions and dispersion slopes in the first and second preset wavelength band of the abovementioned optical fibers (SMF 53, dispersion characteristics adjustment optical fiber 54, and DCF 55).

optical amplification device 52c, and received by optical signal receiving device 56.

Meanwhile, the optical signal of the second preset wavelength band that is sent from optical signal sending device 57 propagates in the direction opposite that of the optical signal of the first preset wavelength band. That is, the optical signal of the second preset wavelength band that is sent is amplified by optical amplification device 58a for optical amplification in the second preset wavelength band (optical amplification in the C-band), and this amplified light enters DCF 55 via circulator 60d. After then propagating through DCF 55 and dispersion characteristics adjustment optical fiber 54, in that order, the light enters optical amplification device 58b via circulator 60c, is amplified by optical amplification device 58b, and via circulator 60b, enters and propagates through SMF 53. Thereafter, the light enters optical amplification device 58c via circulator 60d, is amplified by optical amplification device 58c, and received by optical signal receiving device 59.

The present inventor purports to enable WDM transmission in the bandwidths of both the C-band and the L-band. It is thus important, as has been described above, to compensate the dispersion and dispersion slope of the SMF and to restrict waveform distortion due to nonlinear phenomena in performing WDM transmission. In order to definitely restrict nonlinear phenomena, it is important that the cumulative dispersion of the optical transmission line at the optical signal wavelength does not become zero in the middle of the optical transmission line.

The present inventor has thus constructed the optical transmission system of this embodiment so that neither the cumulative dispersion of the optical transmission line for the optical signal of the first preset wavelength nor the cumulative dispersion of the optical transmission line for the optical signal of the second preset wavelength will be zero from the point immediately after input of the optical signal to the termination of the optical transmission line. That is,

TABLE 5

| Optical fiber | Fiber length (km) | Second preset wavelength band | | | First preset wavelength band | | |
|---|---|---|---|---|---|---|---|
| | | Dispersion (ps/nm/km) | | Dispersion slope (ps/nm²/km) | Dispersion (ps/nm/km) | | Dispersion slope (ps/nm²/km) |
| | | 1535 nm | 1560 nm | | 1575 nm | 1620 nm | |
| SMF 53 | 80.00 | 16.0 | 17.4 | 0.0565 | 18.2 | 20.7 | 0.0555 |
| Adjustment F 54 | 9.00 | −2.95 | −0.2 | 0.110 | 1.5 | 6.4 | 0.110 |
| DCF 55 | 17.45 | −73.4 | −80.0 | −0.250 | −83.9 | −97.0 | −0.290 |

In the optical transmission system of this embodiment, the optical signal of the first preset wavelength band that is sent from optical signal sending device 51 propagates from the left side to the right side of the Figure. That is, the optical signal of the first preset wavelength band that is sent is amplified by optical amplification device 52a for optical amplification in the first preset wavelength band (optical amplification in the L-band), and this amplified light enters SMF 53 via circulator 60d. After propagating through SMF 53, the light enters optical amplification device 52b via circulator 60c, is amplified by optical amplification device 52b, and via circulator 60b, enters and propagates through dispersion characteristics adjustment optical fiber 54 and DCF 55, in that order. Thereafter, the light enters optical amplification device 52c via circulator 60a, is amplified by SMF 53, dispersion characteristics adjustment fiber 54, and DCF 55 were used as the optical fibers that comprise the optical transmission line as described above and the dispersion value and the dispersion slope of the respective optical fibers were determined. Also, the optical signal transmission directions were determined so that the abovementioned optical signal of the first preset wavelength band and the abovementioned optical signal of the second preset wavelength band will be transmitted in mutually opposite directions.

Figure 9:
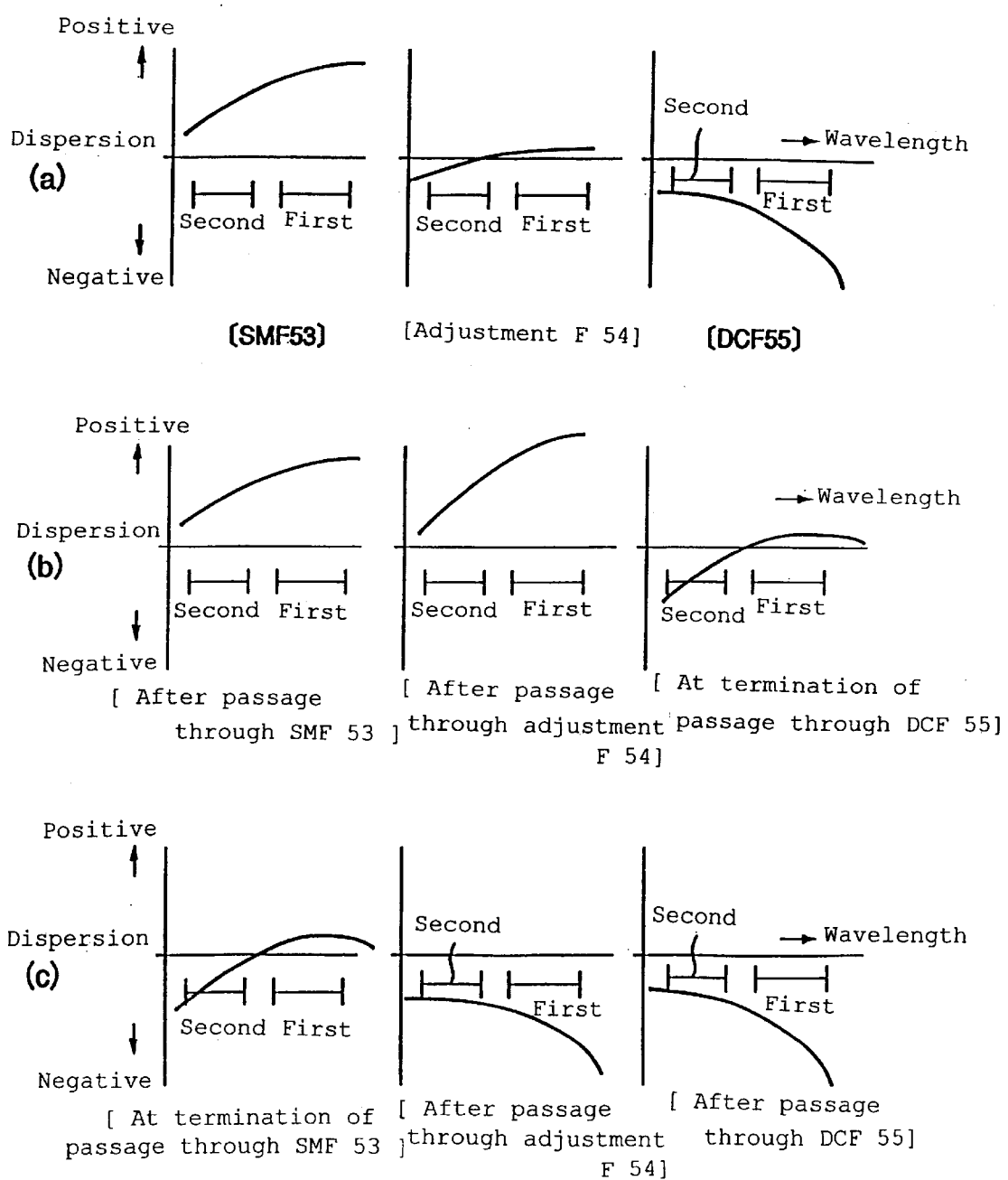
FIG. 9 shows explanatory diagrams with (a) showing the dispersion characteristics of the respective optical fibers that comprise the abovementioned optical transmission system of the first embodiment, (b) showing the cumulative dispersion characteristics when an optical signal of 1520 to 1620 nm passes through this optical transmission system from the left side to the right side of FIG. 8, and (c) showing the cumulative dispersion characteristics when an optical signal of 1520 to 1620 nm passes through this optical transmission system from the left side to the right side of FIG. 8.

To be more specific, the dispersion characteristics of SMF 53, dispersion characteristics adjustment fiber 54, and DCF 55 in the wavelength band of 1520 to 1620 nm (C-band+ L-band) are shown in FIG. 9(*a*). In this Figure, dispersion characteristics adjustment fiber 54 is indicated as "Adjustment F 54." Also, the characteristics of both the first preset wavelength band and the second preset wavelength band are shown in this Figure, with the ranges labeled "First" in the Figure corresponding to the first preset wavelength band and the ranges labeled "Second" in the Figure corresponding to the second preset wavelength band.

(b) of the same Figure shows the cumulative dispersion of the optical transmission line for an optical signal of 1520 to 1620 nm when this optical signal is presumed to be transmitted in the direction of transmission of the first preset wavelength band (in other words, from the left side to the right side of FIG. 8) in the optical transmission system of the present embodiment. To be more specific, the cumulative dispersions of the optical transmission line for an optical signal of 1520 to 1620 nm are shown for the point after passage through SMF 53, the point after passage through dispersion characteristics adjustment fiber 54, and the point after passage through DCF 55 (after passage through the termination of the optical transmission line).

Since only the optical signal of the first preset wavelength band is actually transmitted from the left side to the right side of FIG. 8 in the optical transmission system of this embodiment, the first preset wavelength band shall be noted with regard to FIG. 9(b). As is clear from this Figure, in the optical transmission system of this embodiment, the cumulative dispersion of the optical transmission line for the optical signal of the first preset wavelength will not be zero from the point immediately after input of the signal to the termination of the optical transmission line (that is, across the entire optical transmission line).

Also, the cumulative dispersion of the optical transmission line for the optical signal of the first preset wavelength band is shown more specifically in Table 6 and FIG. 10(a), and this Table and Figure clearly show that the cumulative dispersion of the optical transmission line for the optical signal of the first preset wavelength will not be zero from the point immediately after input of the signal to the termination of the optical transmission line. The cumulative dispersion for light of a wavelength of 1575 nm is shown in FIG. 10(a) and in the Tables from Table 6 onwards, dispersion characteristics adjustment fiber 54 is indicated as "Adjustment F 54."

TABLE 6

| | | Characteristics of the optical fiber | | | Cumulative dispersion of the line (ps/nm) | |
|---|---|---|---|---|---|---|
| | Fiber | Dispersion (ps/nm/km) | | Dispersion | | |
| Optical fiber | length (km) | 1575 nm | 1620 nm | slope (ps/ nm²/km) | 1575 nm | 1620 nm |
| SMF 53 (sending side) | 80.0 | 18.2 | 20.7 | 0.0530 | 1456 | 1656 |
| Adjustment F 54 | 6.0 | 1.5 | 6.4 | 0.110 | 1465 | 1686 |
| DCF 54 (receiving side) | 17.45 | −83.9 | −97.0 | −0.200 | 1 | 2 |

Meanwhile, FIG. 9(c) shows the cumulative dispersion of the optical transmission line for an optical signal of 1520 to 1620 nm when this optical signal is presumed to be transmitted in the direction of transmission of the second preset wavelength band (in other words, from the right side to the left side of FIG. 8) in the optical transmission system of the present embodiment. To be more specific, the cumulative dispersions of the optical transmission line for an optical signal of 1520 to 1620 nm are shown for the point after passage through DCF 55, the point after passage through dispersion characteristics adjustment fiber 54, and the point after passage through SMF 53 (after passage through the termination of the optical transmission line).

Since only the optical signal of the second preset wavelength band is actually transmitted from the right side to the left side of FIG. 8 in the optical transmission system of this embodiment, the second preset wavelength band shall be noted with regard to FIG. 9(c). As is clear from this Figure, in the optical transmission system of this embodiment, the cumulative dispersion of the optical transmission line for the optical signal of the second preset wavelength will also not be zero from the point immediately after input of the signal to the termination of the optical transmission line.

Also, the cumulative dispersion of the optical transmission line for the optical signal of the second preset wavelength band is shown more specifically in Table 6 and FIG. 10(b), and this Table and Figure clearly show that the cumulative dispersion of the optical transmission line for the optical signal of the second preset wavelength will not be zero from the point immediately after input of the signal to the termination of the optical transmission line. The cumulative dispersion for light of a wavelength of 1535 nm is shown in FIG. 10(b).

TABLE 7

| | | Characteristics of the optical fiber | | | Cumulative dispersion of the line (ps/nm) | |
|---|---|---|---|---|---|---|
| | Fiber | Dispersion (ps/nm/km) | | Dispersion | | |
| Optical fiber | length (km) | 1535 nm | 1560 nm | slope (ps/ nm²/km) | 1535 nm | 1560 nm |
| DCF 55 (sending side) | 17.45 | −73.7 | −80.0 | −0.250 | −1286 | −1396 |
| Adjustment F 54 | 6.0 | −2.95 | −0.2 | 0.110 | −1303 | −1367 |
| SMF 55 (receiving side) | 80.0 | 16.0 | 17.4 | 0.0565 | −23 | −5 |

As has been described above, with the optical transmission system of the present embodiment, since neither the cumulative dispersion of the optical transmission line for an optical signal of the first preset wavelength band nor the cumulative dispersion of the optical transmission line for an optical signal of the second preset wavelength band will be zero from the point immediately after the input of the optical signal to the termination of the optical transmission line, waveform distortion due to nonlinear phenomena can be restricted without fail.

In particular, with the optical transmission system of this embodiment, since the directions of transmission were determined so that the optical signal of the first preset wavelength band and the optical signal of the second preset wavelength band will be transmitted in mutually opposite directions, the overlapping of the optical signal of the first preset wavelength band with the optical signal of the second preset wavelength band can also be restricted. Since non-linear phenomena tend to occur more readily as the intensity of the optical signal becomes higher, nonlinear phenomena can be restricted from this aspect as well.

Figure 11:
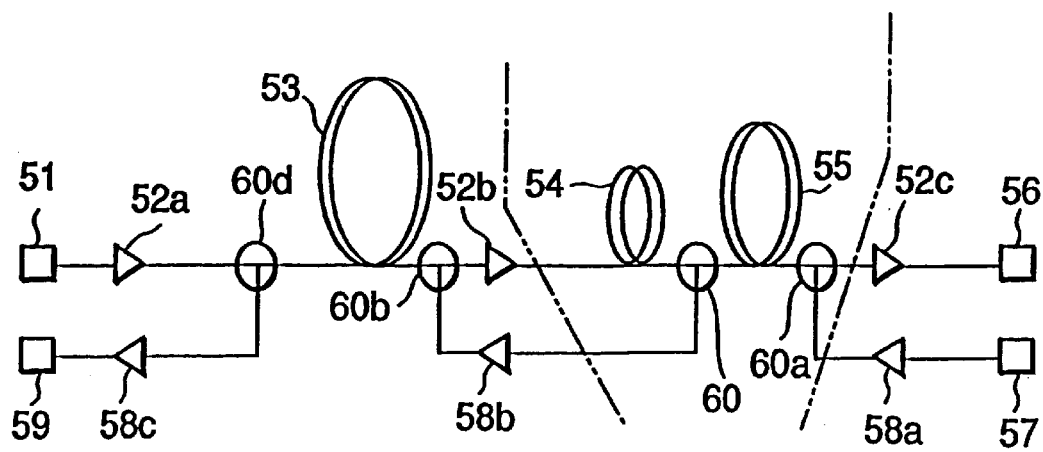
FIG. 11 is a block diagram, which shows an optical transmission system of a second embodiment of this invention.

FIG. 11 shows a second embodiment of an optical transmission system of this invention. The optical transmission system of this second embodiment is arranged in nearly the same manner as the above-described optical transmission system of the first embodiment and the same symbols are attached to parts of the same name. In the description of this second embodiment, parts that overlap with those of the description of the first embodiment given above shall be omitted. The characteristic difference of this second embodiment with respect to the above-described first embodiment is that the position of installation of circulator 60c is set between dispersion characteristics adjustment optical fiber 54 and DCF 55.

By this arrangement, the optical signal of the second preset wavelength, after being transmitted through DCF 55, will be transmitted to the SMF 53 side without passing through dispersion characteristics adjustment optical fiber 54.

Since dispersion characteristics adjustment optical fiber 54 has a positive dispersion slope in the C-band, the slope of the cumulative dispersion in the direction of progress of the optical signal of the second preset wavelength band will be large after passage through both the dispersion characteristics adjustment optical fiber 54 and the SMF 53 as shown in FIG. 9(c). An arrangement such as that of the second embodiment can thus be considered as a way by which just the optical signal of the second preset wavelength band will be prevented from passing through dispersion characteristics adjustment optical fiber 54. With such an arrangement, the slope of the cumulative dispersion of the optical transmission line for the optical signal of the second preset wavelength after passage through both dispersion characteristics adjustment optical fiber 54 and SMF 53 will be small.

The cumulative dispersion of the optical transmission line for the optical signal of the second preset wavelength in the optical transmission system of the second embodiment is shown in Table 8 and FIG. 12(a). As is clear from this Table and Figure, the cumulative dispersion for the optical signal of the second preset wavelength will not be zero from the point immediately after optical signal input to the termination of the optical transmission line in the second embodiment as well. The cumulative dispersion for light of 1535 nm wavelength is shown in FIG. 12(a).

TABLE 8

| | | Characteristics of the optical fiber | | | Cumulative dispersion of the line (ps/nm) | |
|---|---|---|---|---|---|---|
| | Fiber | Dispersion (ps/nm/km) | | Dispersion | | |
| | length (km) | 1535 nm | 1560 nm | slope (ps/nm²/km) | 1535 nm | 1560 nm |
| Optical fiber | | | | | | |
| DCF 55 (sending side) | 17.45 | −73.7 | −80.0 | −0.250 | −1286 | −1396 |
| SMF 53 (receiving side) | 80.0 | 16.0 | 17.4 | 0.0565 | −6 | −4 |

Also with the optical transmission system of the second optical transmission system, since the cumulative dispersion of the optical transmission line for the optical signal of the first preset wavelength band will be the same as that of the above-described first embodiment, the cumulative dispersion for the optical signal of the first preset wavelength will also not be zero from the point immediately after optical signal input to the termination of the optical transmission line.

For reference, the cumulative dispersion of the optical transmission line for the optical signal of the first preset wavelength band in the case where the dispersion characteristics adjustment optical fiber 54 has been omitted is shown in Table 9 and FIG. 12(b). The cumulative dispersion for light of 1575 nm wavelength is shown in FIG. 12(b). In this case, the cumulative dispersion for the optical signal of the first preset wavelength band becomes zero at the termination of the optical transmission line and four-wave optical mixing tends to occur readily. It can thus be understood that an arrangement, in which the optical signal of the first preset wavelength band is made to pass through the dispersion characteristics adjustment optical fiber 54 as in the optical transmission system of the second embodiment, is effective for the restriction of nonlinear phenomena.

TABLE 9

| | | Characteristics of the optical fiber | | | Cumulative dispersion of the line (ps/nm) | |
|---|---|---|---|---|---|---|
| | Fiber | Dispersion (ps/nm/km) | | Dispersion | | |
| | length (km) | 1575 nm | 1620 nm | slope (ps/nm²/km) | 1575 nm | 1620 nm |
| Optical fiber | | | | | | |
| SMF (sending side) | 80.0 | 18.2 | 20.7 | 0.0555 | 1456 | 1656 |
| DCF (receiving side) | 17.45 | −83.9 | −96.95 | −0.290 | −8 | −36 |

Table 10 summarizes the cumulative dispersion value at the termination of the optical transmission line and the occurrence of zero dispersion passage for the optical signal of the first preset wavelength band and the optical signal of the second wavelength band in the optical transmission systems of the second embodiment and the above-described first embodiment. The abovementioned termination of the optical transmission line will differ according to the transmission direction of the optical signal, and will be the termination of DCF 55 in the case of the optical signal of the first preset wavelength and will be the termination of SMF 53 in the case of the optical signal of the second preset wavelength. The results for the case where dispersion characteristics adjustment optical fiber 54 is not installed are also shown as a comparative example in Table 10.

TABLE 10

| Arrangement of the optical transmission | Second preset wavelength band | | | First preset wavelength band | | |
|---|---|---|---|---|---|---|
| | Cumulative dispersion (ps/nm) | | Occurrence of zero dispersion | Cumulative dispersion (ps/nm) | | Occurrence of zero dispersion |
| | 1535 nm | 1560 nm | passage | 1575 nm | 1620 nm | passage |
| First embodiment | −23 | −5 | None | 1 | 2 | None |
| Second embodiment | −6 | −4 | None | 1 | 2 | None |
| Comparative example | −6 | −4 | None | −8 | −36 | Occurs |

As is clear from this Table, whereas the dispersion value for which the absolute value is the maximum in the entire wavelength band of C-band+L-band is −36 ps/nm/km, the dispersion can be reduced significantly to −23 ps/nm/km with the first embodiment of the optical transmission system. The maximum value of the absolute value of the dispersion can be reduced significantly further to −6 ps/nm/km with the second embodiment of the optical transmission system. Also with the respective embodiments of optical transmission system, the cumulative dispersion will not be zero for both the first preset wavelength band and the second preset wavelength band.

The present invention is not limited to above-described embodiments and examples and may be set as suited. For example, the first preset wavelength band, the second preset wavelength band, and the preset wavelength band are not restricted in particular and may be set as suited. For example, the preset wavelength band may be set at a wavelength outside the range of 1520 to 1620 nm.

Also, in the case where a WDM coupler, etc. is used in any of the optical transmission systems of the above-described embodiments to divide the optical signals of the respective wavelength bands of the L-band and the C-band, a wavelength interval of 5 to 10 nm that cannot be used will arise between the first preset wavelength band and the second wavelength band. The optical transmission system may thus be arranged so that the cumulative dispersion for an optical signal in this wavelength band will be zero.

When an optical transmission system is arranged by providing a dispersion characteristics adjustment optical fiber 54 as in any of the optical transmission systems of the above-described embodiments, the dispersion characteristics adjustment optical fiber 54 will have zero dispersion in the first or second preset wavelength band in many cases. Dispersion characteristics adjustment optical fiber 54 is thus preferably disposed not at the end part of the optical transmission line but between an SMF or other positive dispersion optical fiber and the DCF, RDF, or other negative dispersion optical fiber as in the above-described embodiments.

Industrial Applicability

As has been described above, the optical transmission line, the negative dispersion optical fiber used in the optical transmission line, and the optical transmission system that uses the optical transmission line of this invention can compensate the dispersion and dispersion slope of an SMF or other positive dispersion optical fiber. Moreover, since the abovementioned optical transmission line, negative dispersion optical fiber used in the optical transmission line, and the optical transmission system that uses the optical transmission line can also restrict nonlinear phenomena, they are suited for wavelength division multiplexed transmission.

What is claimed is:

1. An optical transmission line comprising:

a positive dispersion optical fiber having a positive dispersion and a positive dispersion slope in a predetermined wavelength band within a wavelength band of 1570 to 1620 nm (L-band); and a negative dispersion optical fiber having a negative dispersion and a negative dispersion slope in said predetermined wavelength band within the L-band, and having a transmission loss of 0.27 dB/km or less in the L-band, a polarization mode dispersion of 0.15 $ps/km^{1/2}$ or less, a mode field diameter of 5.5 $\mu$m or more, and a bending loss that enables the negative dispersion optical fiber to be formed as a cable suitable for use as part of said transmission line, wherein the dispersion value in said predetermined wavelength band falls within a range of −1 to 1 ps/nm/km in the entire optical transmission line comprising said positive dispersion optical fiber and said negative dispersion optical fiber.

2. An optical transmission line as set forth in claim 1, wherein the dispersion value in the 1520 to 1570 nm wavelength band of the optical transmission line as a whole is made greater than or equal to −1 ps/nm/km and less than or equal to 1 ps/nm/km.

3. An optical transmission line as set forth in claim 2, wherein a function for compensating the wavelength dependence of the transmission loss in the wavelength band of 1570 to 1620 nm is added.

4. An optical transmission line as set forth in claim 1, wherein a function for compensating the wavelength dependence of the transmission loss in the wavelength band of 1570 to 1620 nm is added.

5. A negative dispersion optical fiber characterized in being used in any of the optical transmission lines of claim 1, having the dispersion value at an arbitrary single wavelength in the preset wavelength band within the wavelength band of 1570 to 1620 nm being set to greater than or equal to −75 ps/nm/km and less than or equal to −15 ps/nm/km, and being made negative in the value of the dispersion slope in said present wavelength band and thereby provided with the characteristics of lowering the dispersion value and dispersion slope in said present wavelength band of a positive dispersion optical fiber installed in the optical transmission line.

6. A negative dispersion optical fiber as set forth in claim 5, wherein a center core with an outer diameter of a, a side core, which surrounds the center core and has an outer diameter of b, and a cladding, which surrounds the side core, are provided, and when the specific differential refractive indices of said center core and side core based on the refractive index of said cladding are given as Δ1 and Δ2, respectively, the value of a/b is set within the range, 0.4 to 0.55, the value of Δ2/Δ1 is set within the range, −0.45 to −0.30, Δ1 is set within the range, 1 to 1.4%, and the value of a is set within the range 10.5 to 14.0 μm.

7. A negative dispersion optical fiber as set forth in claim 5, wherein a center core with an outer diameter of a, a first side core, which surrounds the center core and has an outer diameter of b, a second side core, which surrounds the first side core and has an outer diameter of c, and a cladding, which surrounds the second side core, are provided, and when the specific differential refractive indices of said center core, first side core, and second side core based on the refractive index of said cladding are given as Δ1, Δ2 and Δ3, respectively, the value of Δ1 is set within the range, 0.9 to 1.5%, the value of Δ2 is set within the range, −0.5 to −0.2%, the value of Δ3 is set within the range, 0.2 to 0.3%, a, b, and c are set to satisfy a <b <c, the value of a:b:c is set within the range, 1:2 to 2.5:2.5 to 3.5, and the value of c is set within the range 13 to 19 μm.

8. An optical transmission system as set forth in claim 7, wherein the optical signal of the first preset wavelength band and the optical signal of the second preset wavelength band are transmitted in mutually opposite directions.

9. An optical transmission system characterized in that an optical transmission line of claim 1 is configured to segregate an optical signal transmitted therealong into a first preset wavelength band within a wavelength band of 1570 to 1620 nm and an optical signal of a second preset wavelength band within a wavelength band adjacent the wavelength band of 1570 to 1620 nm.

10. An optical transmission system as set forth in claim 9, wherein the respective dispersion values and dispersion slopes of the optical fibers that comprise the optical transmission line and the transmission directions of the optical signals are determined so that neither the cumulative dispersion of the optical transmission line with respect to the optical signal of the first preset wavelength band nor the cumulative dispersion of the optical transmission line with respect to the optical signal of the second preset wavelength band will be zero from the point immediately after optical signal input to the termination of the optical transmission line.

11. An optical transmission line comprising:
  a positive dispersion optical fiber having a positive dispersion and a positive dispersion slope in a p redetermined wavelength band within a wavelength band of 1570 to 1620 nm (L-band);
  a negative dispersion optical fiber having a negative dispersion and a negative dispersion slope in a predetermined wavelength band adjacent to the L-band, and having a transmission loss of 0.27 dB/km or less in the wavelength band adjacent to the L-band, a polarization mode dispersion of 0.15 ps/km$^{1/2}$ or less, a mode field diameter of 5.5 μm or more, and a bending loss that enables the negative dispersion optical fiber to be formed as a cable suitable for use as part of said transmission line; and
  a fiber for dispersion characteristics adjustment to compensate the dispersion and the dispersion slope in said predetermined wavelength band of said optical transmission line comprising said positive dispersion optical fiber and said negative dispersion optical fiber, wherein the dispersion value in said predetermined wavelength band falls within a range of −1 to 1 ps/nm/km in the entire optical transmission line comprising said positive dispersion optical fiber, said negative dispersion optical fiber and said fiber for dispersion characteristics adjustment.

12. An optical transmission line as set forth in claim 11, wherein the wavelength band adjacent the wavelength band of 1570 to 1620 nm is set to the wavelength band of 1520 to 1570 nm.

13. An optical transmission line comprising:
  a positive dispersion optical fiber having a positive dispersion and a positive dispersion slope in a predetermined wavelength band within a wavelength band of 1520 to 1570 nm (C-band);
  a negative dispersion optical fiber having a negative dispersion and a negative dispersion slope in a predetermined wavelength band adjacent to the C-band, and having a transmission loss of 0.27 dB/km or less in the wavelength band adjacent to the C-band, a polarization mode dispersion of 0.15 ps/km$^{1/2}$ or less, a mode field diameter of 5.5 μm or more, and a bending loss that enables the negative dispersion optical fiber to be formed as a cable suitable for use as part of said transmission line; and
  a fiber for dispersion characteristics adjustment to compensate the dispersion and the dispersion slope in said predetermined wavelength band of an optical transmission line comprising said positive dispersion optical fiber and said negative dispersion optical fiber, wherein the dispersion value in said predetermined wavelength band within said C-band falls within a range of −1 to 1 ps/nm/km in the entire optical transmission line comprising said positive dispersion optical fiber said negative dispersion optical fiber and said fiber for dispersion characteristics adjustment.

14. An optical transmission line as set forth in claim 13, wherein the wavelength band adjacent to the wavelength band of 1520 to 1570 nm is set to the wavelength band of 1570 to 1620 nm.

* * * * *